(12) United States Patent  
Good

(10) Patent No.: US 6,328,386 B1
(45) Date of Patent: Dec. 11, 2001

(54) SEAT BELT SYSTEM

(75) Inventor: Merrill Good, San Antonio, TX (US)

(73) Assignee: Takata Seat Belts Inc., Auburn Hills, MI (US)

( * ) Notice: Subject to any disclaimer, the term of this patent is extended or adjusted under 35 U.S.C. 154(b) by 0 days.

(21) Appl. No.: 09/481,217

(22) Filed: Jan. 11, 2000

(51) Int. Cl.[7] .................... A62B 35/00; B60R 22/12
(52) U.S. Cl. ............... 297/483; 297/378.1; 297/378.12
(58) Field of Search .................................... 297/483, 248, 297/378.1, 378.12; 280/801, 806

(56) References Cited

U.S. PATENT DOCUMENTS

| | | |
|---|---|---|
| 3,768,862 | 10/1973 | Williams, Jr. . |
| 4,480,854 | 11/1984 | Doty . |
| 4,810,037 | 3/1989 | Takagi . |
| 4,885,825 | 12/1989 | Kitazawa et al. . |
| 4,903,377 | 2/1990 | Doty . |
| 5,014,401 | 5/1991 | Kitazawa . |
| 5,054,815 | 10/1991 | Gavagan . |
| 5,469,014 | 11/1995 | Gimbel et al. . |
| 5,839,137 | 11/1998 | Butler et al. . |

*Primary Examiner*—Peter M. Cuomo
*Assistant Examiner*—Rodney B. White
(74) *Attorney, Agent, or Firm*—Fitch, Even, Tabin & Flannery

(57) ABSTRACT

A seat belt system is provided for use in the rear seating area of a vehicle. The system has first and second tongue and buckle sets that are identical on outboard seats or either side of the center seat. The first and second sets are for use with a standard three-point shoulder and lap restraint system. The center seat also has a three-point restraint system but uses third and fourth tongue and buckle sets therefor with both tongues mounted to a single length of belt so that when disconnected from their corresponding buckles, the center seat back rest can be pivoted down without interference from the center seat belt restraint system. In addition, the tongues will only releasably lock in their corresponding buckles. To this end, the fourth tongue and buckle have a key and keyway mating fit to prevent the fourth tongue from locking in the other buckles. The fourth buckle uses one of the ejectors of the other buckles and lengthens the housing lower cover slightly over the standard length of the housing of the other buckles to prevent the other tongues from being releasably locked therein.

19 Claims, 14 Drawing Sheets

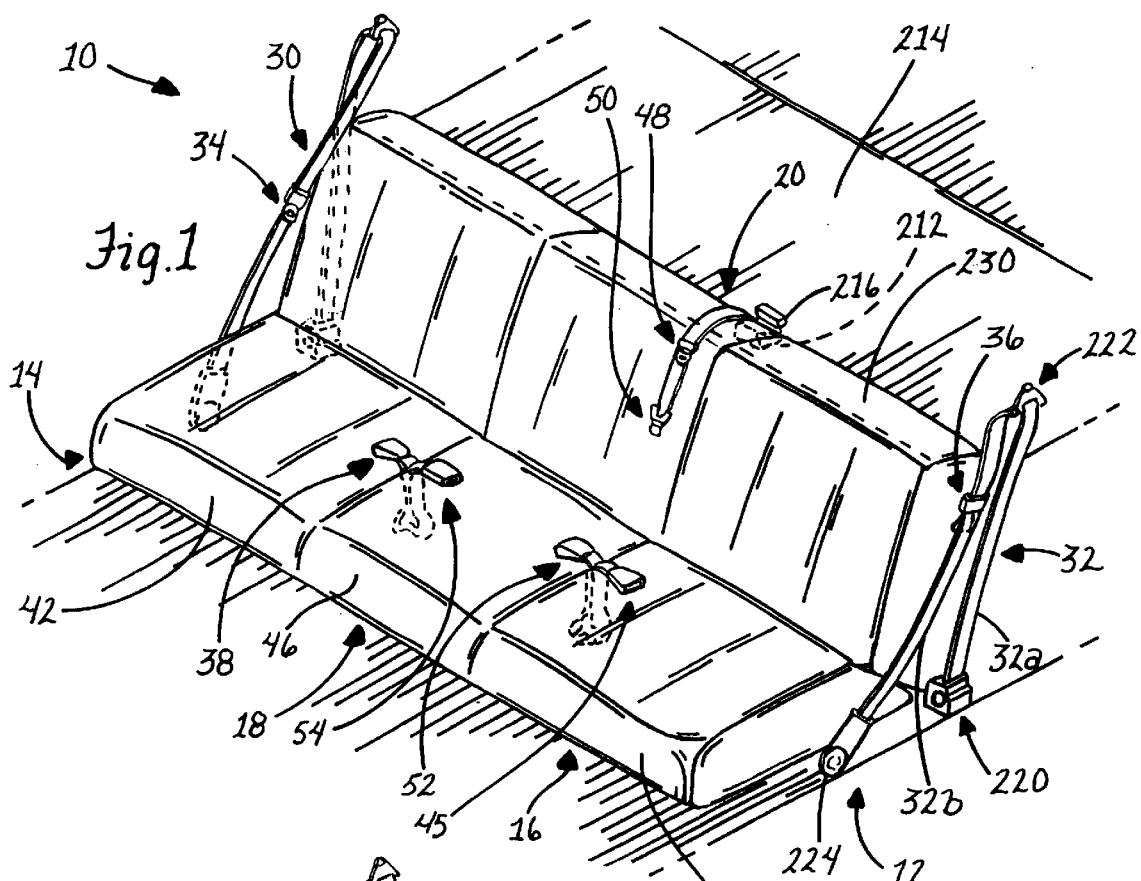
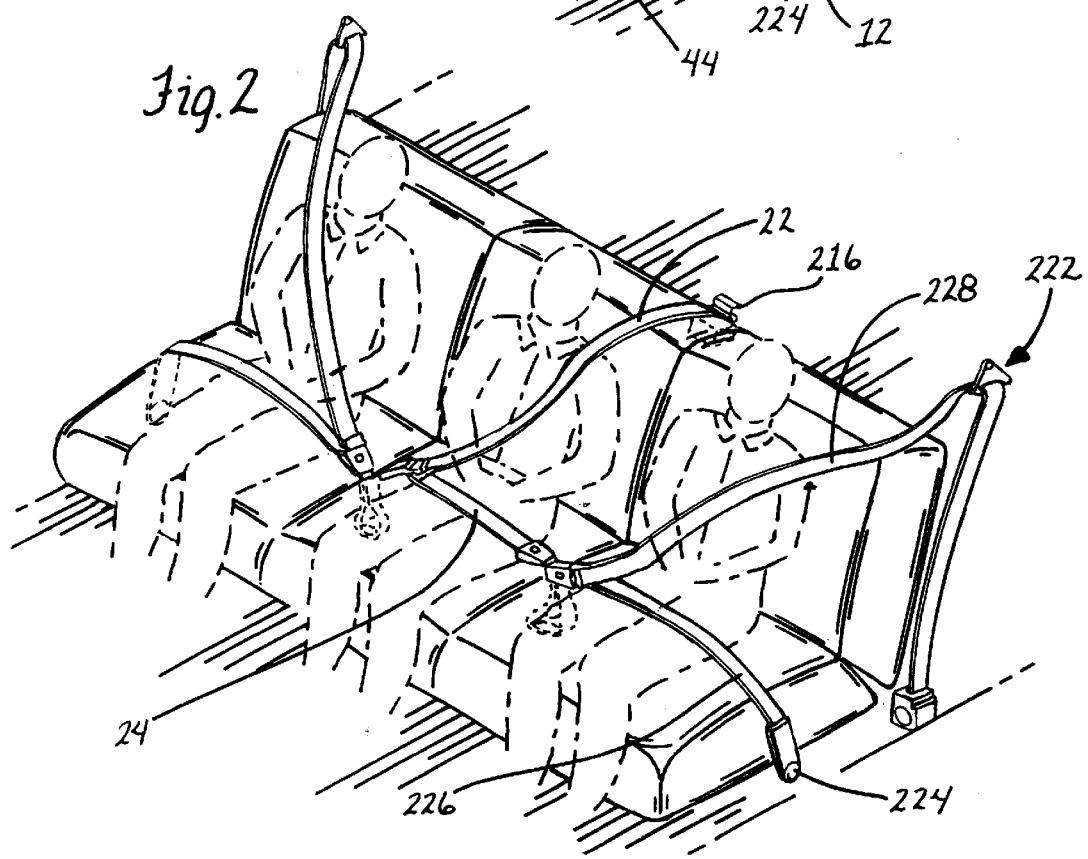

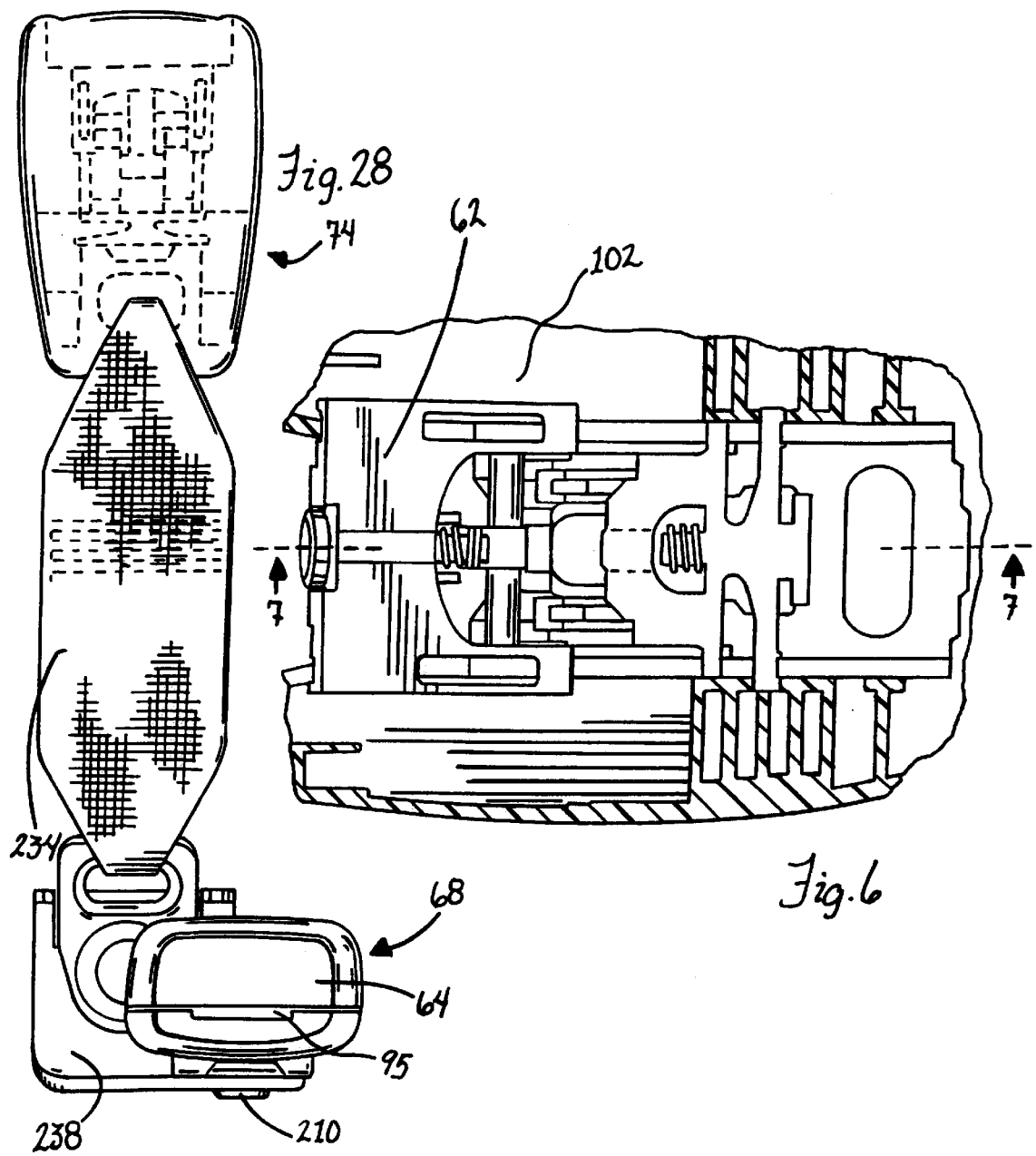
Fig. 28
Fig. 6
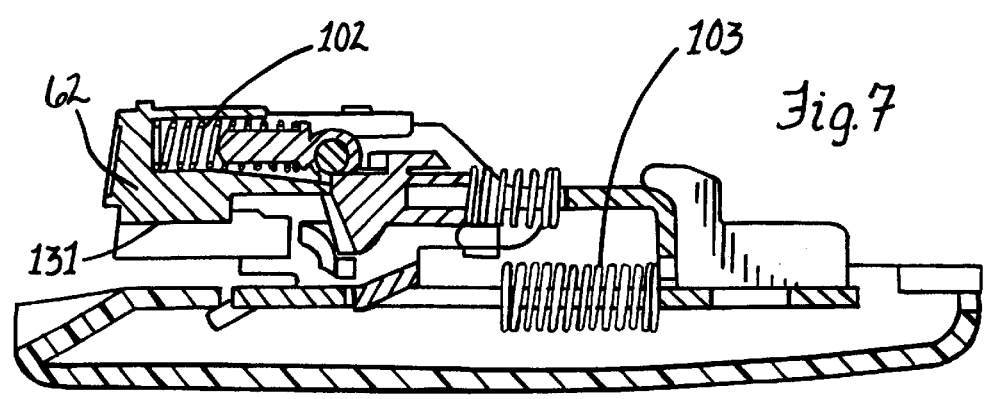
Fig. 7

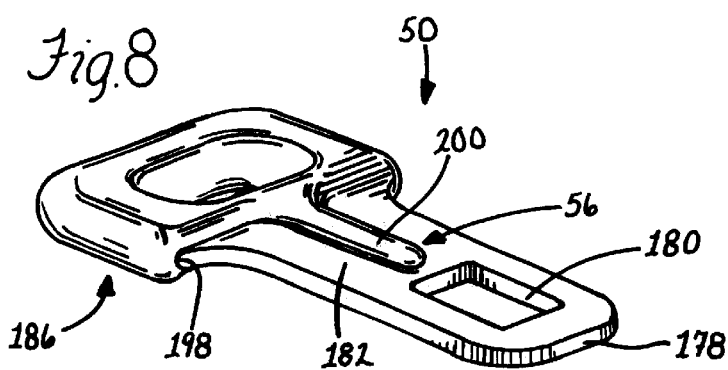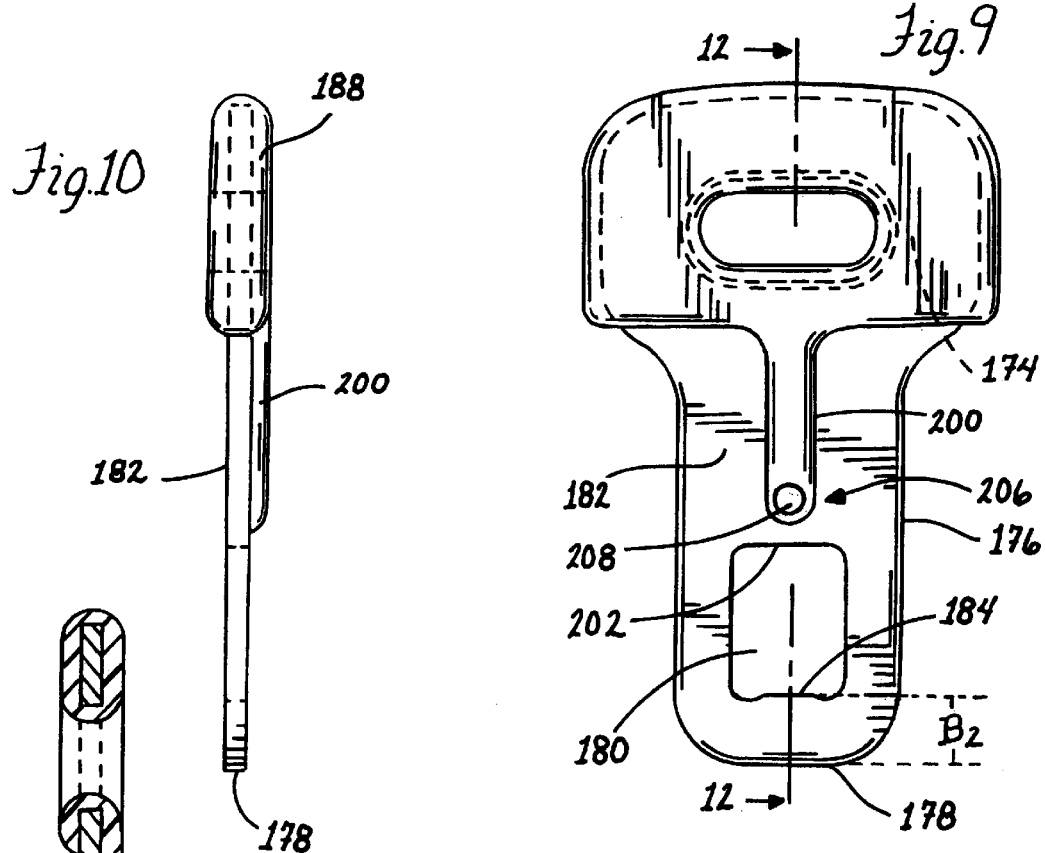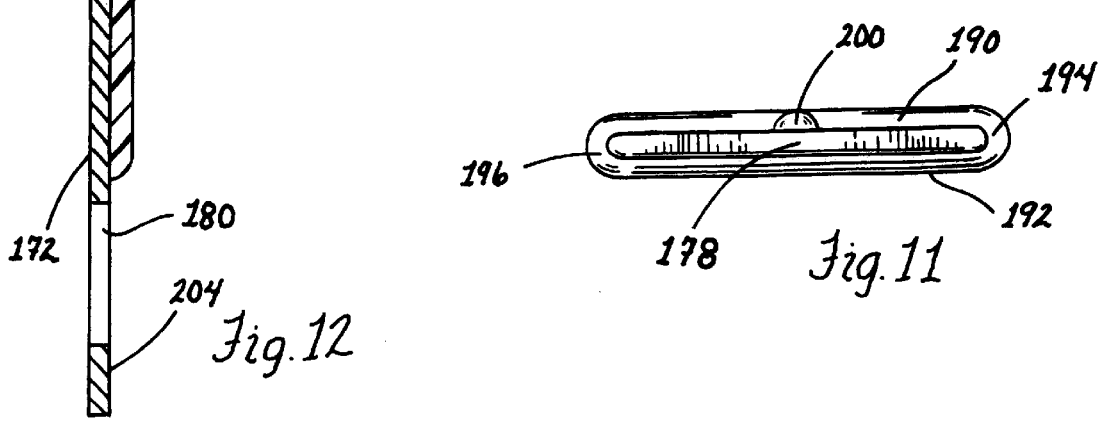

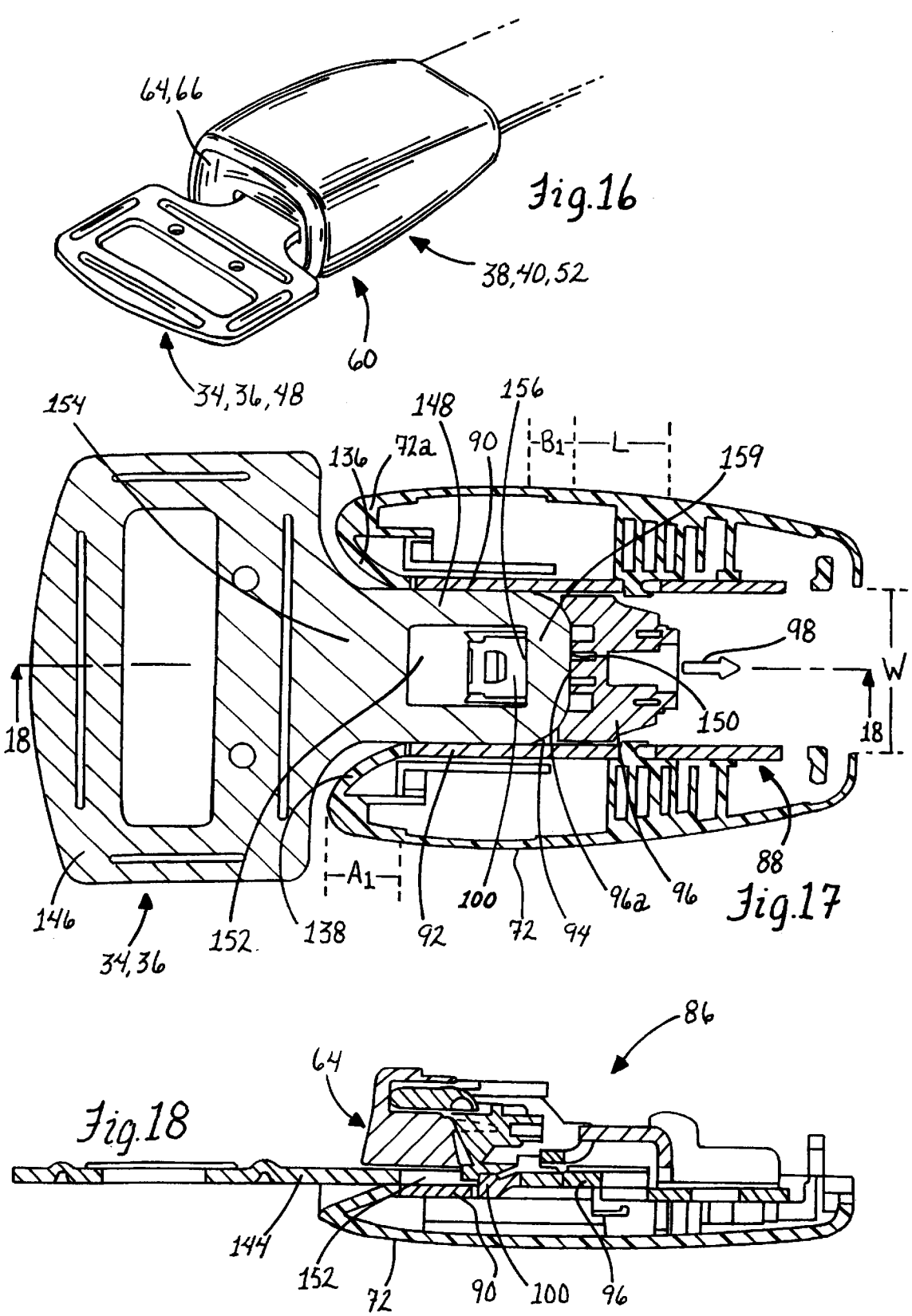

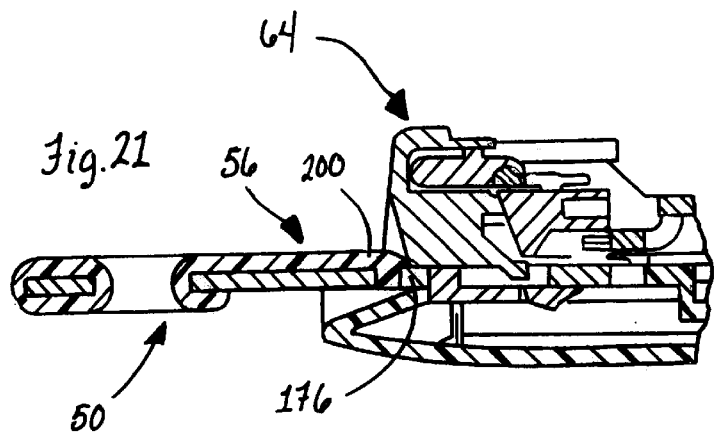

Fig. 21

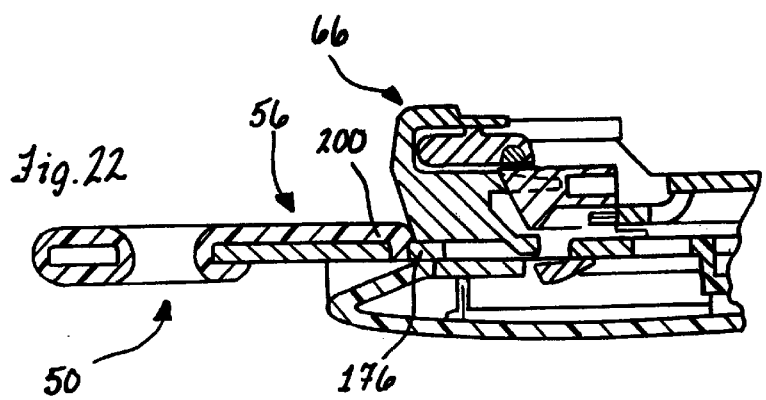

| BUCKLE ASM (EJECTOR TYPE) | | | | |
|---|---|---|---|---|
| | | OUTBOARD | CENTER | 4th POSITION |
| TONGUE (TONGUE LENGTH) | OUTBOARD (SHORTER TONGUE SECTION) | NO INTERERENCE | INTERFERENCE BETWEEN TONGUE AND LOWER COVER | INTERFERENCE BETWEEN TONGUE AND LOWER COVER |
| | CENTER (LONGER TONGUE SECTION) | INTERFERENCE BETWEEN LOCKBAR AND TONGUE | NO INTERFERENCE | INTERFERENCE BETWEEN LOCKBAR AND TONGUE |
| | 4th POSITION (SHORTER TONGUE SECTION) | INTERFERENCE BETWEEN PRESS BUTTON AND PLASTIC RIB ON TONGUE | INTERFERENCE BETWEEN PRESS BUTTON AND PLASTIC RIB ON TONGUE | NO INTERFERENCE |

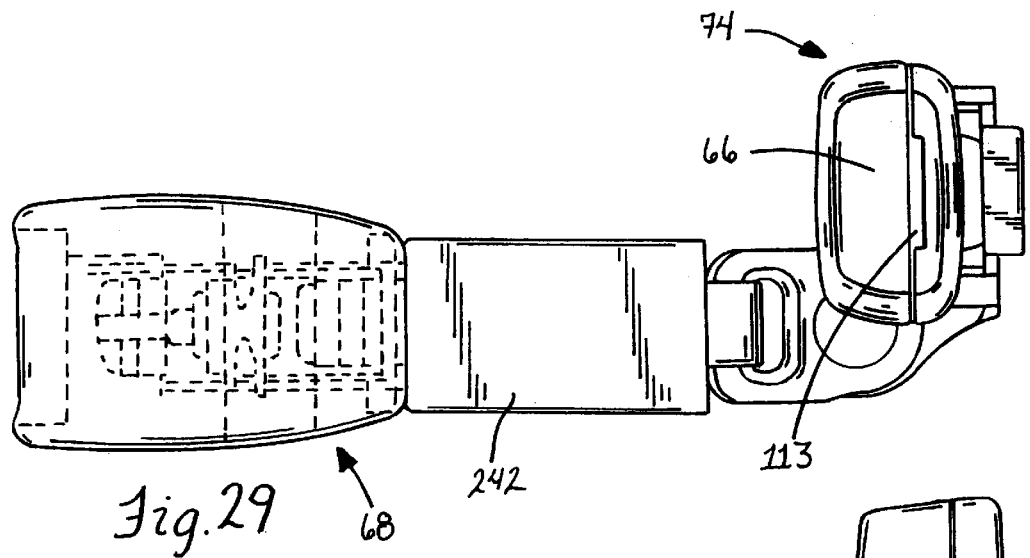
Fig. 29
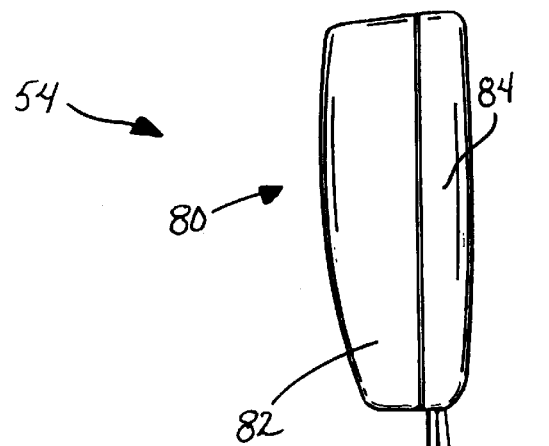
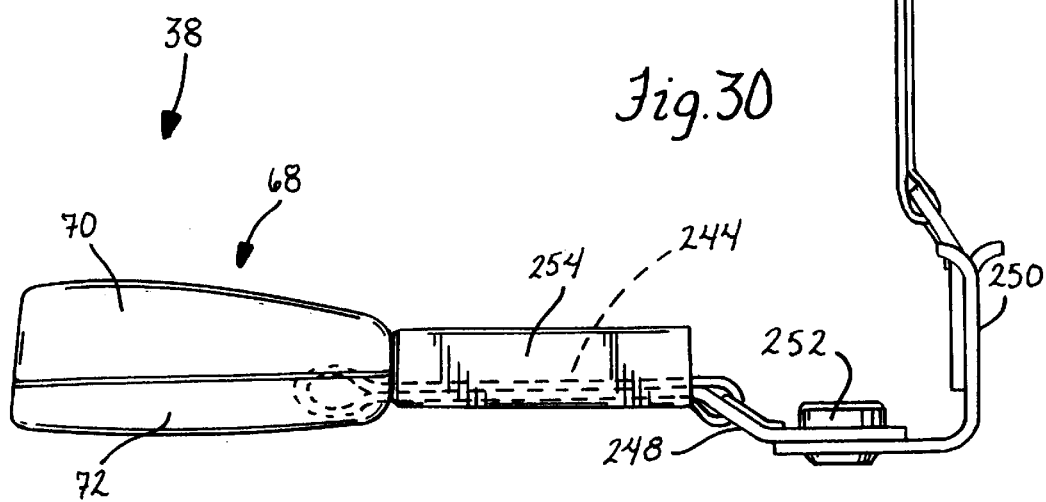
Fig. 30

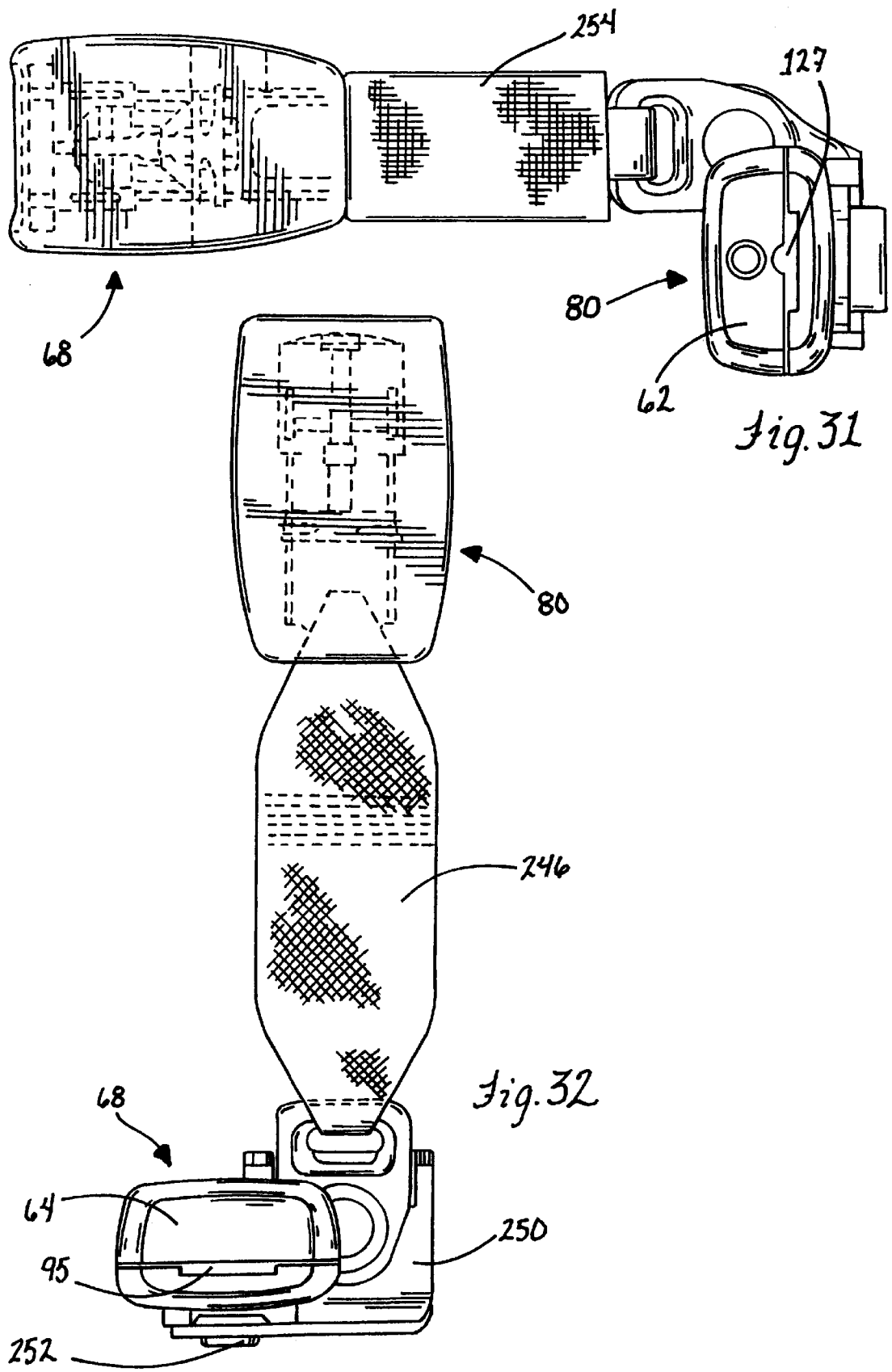

SEAT BELT SYSTEM

FIELD OF THE INVENTION

The invention relates to seat belts for seat belt restraint systems for vehicles, and more particularly, to the tongues and buckles used with the belts to restrain passengers in their seats.

BACKGROUND OF THE INVENTION

In most recent year makes of automobiles, the rear bench seat has back rests that can be pivoted down so that passengers in the passenger compartment can gain access to the cargo space in the rear or trunk of the car. In these rear bench seats, the outboard or endmost seats on either side of the inboard or center seat usually have three-point belt systems with shoulder and lap belt portions that are secured by a single tongue plate of a tip assembly in locking engagement with a buckle for restraining the passengers seated thereon. The three-point mounting typically includes an anchor and a retractor and/or a turning loop that are fixed to the vehicle adjacent to and outboard of the end seat, and a buckle that is located inboard of and along the outboard seat between it and the center seat. When buckled, the span of the belt from the tip assembly to the anchor defines a lap belt portion extending over the lap of a seat occupant, while another portion of the belt extending upwardly from the tip assembly defines a shoulder belt portion extending across the chest and shoulder of the seat occupant to the turning loop or the seat belt retractor located above the passengers shoulder such as high on a pillar or roof rail of the vehicle. When unbuckled, the retractor draws in belting so that the belt including the tip assembly thereon extends only between the retractor and/or turning loop and the anchor outboard of the end seats. In this manner, the three-point shoulder and lap belting systems do not interfere with downward pivoting of the back rests of the outboard seats for providing access to the trunk.

With respect to the center seat, the three-point belt systems are not as readily utilized because the location of the upper and lower mounting points between which the belt extends when unbuckled causes the belt webbing to interfere with folding down of the back rest of the center seat. Because the upper mounting point of a three-point center seat belt has to mount to the rear shelf behind the rear seats, to obtain the proper direction for the belt across the shoulder and chest of the seated passenger from the shelf to the buckle, the location of the upper point has to be substantially aligned with or inboard of the side of the center seat. The lower mounting point is situated between the center seat and adjacent outboard seat so that with the three-point belt unbuckled, the belt will generally include a length that extends over the back rest thereby requiring a passenger to pull this belt length out of the way before pivoting the center seat back rest down. Accordingly, typically these three-point type of shoulder and lap belting systems are not preferred for use in conjunction with the center seat.

Another shortcoming with seat belt systems used with multiple seats in side-by-side relation to each other such as with bench seating having outboard seats flanking either side of a center seat in the rear seating area of a vehicle as described above is that typically several tongue plates and/or buckles are laying in closely adjacent positions relative to each other prior to use. Where this arrangement is present, it is not uncommon for a passenger to insert a tongue plate from one seat into a buckle housing from another seat or to take the tongue plate from another seat and insert it into the buckle housing of the seat they are sitting in. Either way, this makes it impossible for the passenger seated next to them to find the right tongue plate or buckle for securing their seat belt about themselves. While it is known to provide seat specific tongues and buckles that will not work with tongues and buckles of adjacent seats, these systems typically involve significant redesign in the construction of the tongues and the internal operating components of the buckles, raising costs accordingly. Further, these prior systems are for use with the center and outboard rear seats in automobiles that each utilize a single tongue and buckle set on their respective belts so that only two different sets are needed. As the number of sets of tongues and buckles increases so does the concern for cost containment.

Accordingly, an improved restraint system for use with fold down center seats would be desirable. In this regard, a center seat restraint system that more readily allows the back rest to be folded down is needed. Further, a seat belt system that effectively eliminates the risk of having passengers in adjacent seats insert tongue plates into incorrect buckles and which does so in an inexpensive fashion is needed.

SUMMARY OF THE INVENTION

In accordance with the present invention, a seat belt system is provided including a belt for use with an intermediate or center seat having outboard seats on either side thereof and having a back rest that can be folded down for providing access to the cargo space from the passenger compartment of a vehicle. The center seat belt includes two sets of tongues and buckles therefor with one of the sets being for use with a shoulder belt portion of the belt to secure a passenger with lap and shoulder belting on the center seat. This allows the tongues and buckles of the center seat belt including the shoulder belt portion thereof to be disconnected so that the back rest of the intermediate seat can be pivoted down for accessing the cargo space without encountering interference from the shoulder belt portion. Thus, the present seat belt system provides additional restraint on a passenger seated on the center seat with both lap belt and shoulder portions while also allowing the back rest of the center seat to be pivoted down simply by disconnecting the tongues from their respective buckles of the center seat belting.

Accordingly, the present invention includes an additional or a so-called fourth tongue and buckle set for the belt of the center seat. The seats on either side of the center seat have first and second tongues and buckles for their seat belts with the first and second sets being identical to each other. A third tongue and buckle set and the fourth tongue and buckle set are for the belt for the center seat and are different from each other and from the first and second sets of tongues and buckles to preclude tongues for the center belt from being inserted into locked condition in either the buckle for the other tongue on the center belt or the buckles for the outboard seat belt. In a similar fashion, the tongues for the outboard seat belt cannot be locked in either one of the buckles for the center seat belt due to the above-noted differences. With the seats on either side of the center seat, there is limited chance that the tongues and buckles thereof can be confused by passengers sitting thereon as they are separated from each other due to the presence of the center seat therebetween. On the other hand, it is important that the tongue and buckle used with the belt on the center seat not be able to be used with the tongues and buckles of the seats on either side thereof These differences between the sets of tongues and buckles primarily are subtle ones and/or changes that are relatively inexpensive to implement so as not to require significant redesign of the various operating components thereof As stated, the present invention contemplates an additional tongue and buckle being provided on the center seat belt to allow the back rest on the center seat to be pivoted down. The additional tongue and buckle herein are provided with a predetermined configuration that precludes their use with the other tongue and buckle set on the center seat belt and the tongues and buckles of the adjacent outboard seats. In this manner, the present invention allows the center seat belt webbing to use two sets of tongues and buckles that have to be correctly used for releasably locking a tongue in the proper buckle therefor despite the presence of outboard seats on either side of the center seat including tongues and buckles for the belts thereof. In other words, the present invention allows four sets of tongues and buckles to be utilized with three seats and by three passengers seated thereon without allowing the two tongues on the center belt from being used with the incorrect buckles on the center belt or the buckles for the outboard seat belts and similarly preventing the tongues on the outboard seat belts from being used in the buckles for the center seat belt.

In a preferred form, the additional tongue and buckle set that is provided for the center seat belt has a tongue and buckle which have a key and keyway mating fit with each other. The key is preferably provided on the tongue with the keyway formed in the press button of the buckle. In this manner, the key on the tongue will interfere with the press buttons on the other buckles should a passenger attempt to slide the keyed tongue therein.

In one form of the invention, a seat belt system for vehicles is provided including a plurality of seats arranged in side-to-side relation. An intermediate seat having seats on either side thereof is provided and includes a lower seat rest and a pivotal back rest. Sets of tongues and buckles for belts of each of the seats are provided with each having a locked condition for restraining passengers on the seats. The buckles have latching mechanisms that are shifted to the locked condition when the corresponding tongues in the sets are inserted to a predetermined depth therein. A belt of the intermediate seat includes a shoulder belt portion. An additional set of a tongue and a buckle for the shoulder belt portion is provided and having a locked condition for restraining a passenger in the intermediate seat with the back rest thereof pivoted up. The tongue and buckle set for the center seat belt and the additional tongue and buckle set for the shoulder belt portion are disconnected from each other to allow the back rest of the intermediate seat to pivoted down toward the seat rest thereof without interference from the center seat belt including the shoulder belt portion thereof Accordingly, the additional tongue and buckle set provided for the shoulder belt portion allows the center seat to utilize belting that includes restraint for the passenger across both their lap and their chest and shoulder regions of their body while still allowing the back rest of the center seat to be pivoted down when it is desired to gain access to the trunk from the passenger compartment.

In one form, the tongue and buckle sets for the intermediate seat and side seats and the additional tongue and buckle set for the shoulder portion include three different sets with one set including two identical sets of tongue and buckles one for each of the side seats, a second set being for the intermediate seat and a third set being for the shoulder belt portion of the intermediate seat belt with the tongues of the three different sets only capable of being inserted into locked condition in the buckle of their set. In this manner, passengers cannot mistakenly insert tongues for the side seat belts into the pair of buckles used for the center seat belt nor can they accidently take the pair of tongues used for the center seat belt and insert them in the buckles for the side seat belts. Further, a passenger cannot mistakenly insert one of the tongues of the center belt into the wrong one of the buckles for the center belt.

Preferably, the belt for the intermediate seat is a single length of belt including the shoulder belt portion and has a free end with the additional set tongue being attached thereat and the other tongue for the intermediate seat belt being attached to the belt along the length thereof spaced from the free end where the additional set tongue is disposed.

In another form of the invention, a seat belt restraint system for seats that are adjacent to each other is provided and includes a first tongue and buckle for a first belt of a first one of the adjacent seats and having a first predetermined configuration with the first tongue releasably locking in the first buckle to restrain an occupant of the first seat, and a second tongue and buckle for a second belt of a second one of the adjacent seats and having a second predetermined configuration with the second tongue releasably locking in the second buckle to restrain an occupant of the second seat. The first tongue and buckle first predetermined configuration is identical to the second tongue and buckle second predetermined configuration with the first and second seats being spaced from each other by a third one of the adjacent seats therebetween. A third tongue and buckle for a third belt of the third seat is provided and having, a third predetermined configuration with the third tongue releasably locking in the third buckle. The third tongue and buckle third predetermined configuration differs from the identical first and second predetermined configurations of the first and second tongues and buckles so that the third tongue cannot be releasably locked in the first and second buckles and the first and second tongues cannot be releasably locked in the third buckle. A fourth tongue and buckle for a portion of the third belt is provided and having a fourth predetermined configuration with the fourth tongue releasably locking in the fourth buckle to restrain an occupant of the third seat with the third tongue releasably locked in the third buckle. The fourth tongue and buckle fourth predetermined configuration differs from the identical first and second predetermined configurations of the first and second tongues and buckles and the third predetermined configuration of the third tongue and buckle so that the fourth tongue cannot be releasably locked in the first, second or third buckles and the first, second and third tongues can not be releasably locked in the fourth buckle. Accordingly, the invention provides for four different sets of tongues and buckles for use with three adjacent seats such as the outboard and center seats in the back seat of a car. In addition, the tongues of the center seat belt can only be used with the appropriate buckles therefor and further cannot be used with the outboard buckles. Similarly, the tongues for the outboard seat belts cannot be used with the buckles for the center seat belt.

In a preferred form, the tongues have a lead-in portion and the buckles have an insertion portion including a passageway opening for the tongue lead-in portion. A key and keyway are provided on the tongue lead-in portion and buckle insertion portion of the fourth tongue and buckle for the third belt portion. The lead-in portion key of the fourth tongue interferes with the insertion portions of the other buckles to prevent the fourth tongue from being inserted into locked condition therein. Preferably, the insertion portions include push buttons with the keyway being in the push button of the fourth buckle so that with the tongue lead-in portion of the fourth tongue inserted in the passageway opening of the fourth buckle, the key will mate with the push button keyway and engage against the push buttons of other buckles lacking the keyway to prevent full insertion of the fourth tongue therein.

In one form, the third and fourth buckles are disposed adjacent the first and second buckles and the buckles each have a latching mechanism that are shifted to a locked condition when the corresponding tongues are inserted to a predetermined depth therein. The fourth buckle latching mechanism is identical to the latching mechanism of one of the identical buckles and the third buckle so that the tongue associated with the other of the identical and third buckles cannot be inserted into locked condition therein. The fourth buckle has a housing portion which prevents the tongue associated with the one buckle from being inserted into locked condition therein. In this manner, the first, second and third tongues on the outboard and center belts cannot be inserted into locked condition in the fourth buckle without requiring significant modifications to the design of the fourth buckle over the other buckles as it uses a latching mechanism of one of the other buckles and changes only a portion of its housing to prevent such locking.

In a preferred form, the housing portion has a predetermined length sized to prevent the tongue associated with the one buckle from being inserted into the predetermined depth in the fourth buckle.

In another preferred form, the tongues each include a window opening and the latching mechanisms each include a actuator and a lock bar for being shifted into the tongue openings by the actuators with the tongues inserted into the corresponding buckles to the predetermined depth. The actuators of the identical latching mechanisms have a predetermined length and the opening of the tongue associated with the other buckle is disposed at a predetermined position along the tongue lead-in portion which is coordinated with the predetermined length of the actuators so that with the tongue associated with the other buckle inserted to the predetermined depth in the fourth buckle, the lock bar will not register in the tongue opening for locking the tongue in the shoulder in the fourth buckle.

In another aspect of the invention, a tongue and buckle set for a seat belt is provided including a buckle housing have an operating mechanism therein and a tongue body having a lead-in portion. A passageway in the housing is sized for sliding receipt of the lead-in portion. A distal end of the lead-in portion actuates the operating mechanism to releasably lock the lead-in portion in the buckle housing once slid in the passageway so that the distal end is at the predetermined depth therein. A key and keyway of the tongue body and buckle housing have a mating fit to allow the tongue body lead-in portion to slide into the passageway and limit its ability to slide in passageways of other different buckles.

In one form, the buckle housing includes an entry opening at one end thereof leading to the passageway sized to receive the lead-in portion therethrough and orient the key for fitting into the keyway. Thus, a passenger does not have to maneuver the tongue body to try to fit the key in the keyway beyond inserting the lead-in portion in the housing passageway.

Preferably, the lead-in portion includes a proximate portion having the key thereon and a window opening between the lead-in portion distal end and the proximate portion so that the lead-in portion can be partially inserted into the passageway before the key mates with the keyway and prior to reaching full insertion depth therein. Accordingly, the passenger can begin sliding the lead-in portion into the passageway with continued sliding eventually causing the key to mate into the keyway until the lead-in portion is releasably locked in the buckle housing at the predetermined depth therein.

In one form, the tongue body is substantially of a metal material and the key is on the tongue body and is of a plastic material. Preferably, the tongue body has a gripping portion that is wider than the lead-in portion so that it does not fit in the passageway. A molded plastic sleeve can be provided to tightly fit about the gripping portion with the key being a plastic raised portion such as in the form of a rib integral with the sleeve and extending along the lead-in portion. Other types of raised key portions such as flanges or bosses could also be utilized. The use of a molded plastic sleeve including the raised key portion thereon obviates the need to provide special accommodations for manufacturing the metallic tongue body with a raised rib thereon. Alternatively, the sleeve and/or raised key portion could be of other materials; or the raised key portion could be formed integrally with the tongue body.

BRIEF DESCRIPTION OF THE DRAWINGS

FIG. 1 is a perspective view of a rear seating area in an automobile showing a center seat and outboard seats on either side thereof each including seat belts having lap and shoulder portions and the various tongues and buckles therefor;

FIG. 2 is a perspective view similar to FIG. 1 showing passengers restrained in each of the rear seats with the tongues locked in their respective buckles;

FIG. 6 is a plan view partially in section of the buckle showing the operating mechanism for releasably locking the tongue therein;

FIG. 7 is a cross-sectional view taken along line 7—7 of FIG. 6 showing the press button including a notch keyway for the key of the tongue to be received therein;

FIGS. 8–12 are various views of the tongue for the shoulder belt portion of the center belt showing a tongue body having an enlarged gripping area and a lead-in portion with a molded plastic sleeve tightly fit about the gripping portion and including an integral raised key rib on the tongue lead-in portion;

FIG. 16 is a perspective view of one of the non-keyed tongues releasably locked in the corresponding buckle therefor;

FIG. 17 is a cross-sectional view showing the outboard seat belt tongue having its lead-in portion inserted to a predetermined depth in a passageway in the buckle therefor pushing an ejector and causing a lock bar to latch in a window opening of the tongue lead-in portion;

FIG. 18 is a cross-sectional view taken along line 18—18 of FIG. 17;

FIG. 21 is a side-sectional fragmentary view of the rib on the shoulder belt portion tongue of the center belt engaging against the press button of the buckle for the outboard seat belt to prevent it being releasably locked therein;

FIG. 22 is a side-sectional fragmentary view of the rib on the tongue for the shoulder belt portion of the center belt engaging against the press button of the buckle for the lap belt portion on of the center belt to prevent it from being releasably locked therein;

FIG. 26 is a chart showing the different tongues and buckles and the outcomes when a passenger attempts to insert the lead-in portion of the tongue in the different buckles;

FIG. 28 is a front elevation view of the buckles of FIG. 27 showing the entry opening to the lap belt portion buckle of the center seat belt below the press button thereof;

FIG. 29 is a front elevation view similar to FIG. 28 except showing an entry opening to the passageway of the buckle for the outboard seat belt below the press button thereof;

FIG. 30 is an elevation view of the buckle for the shoulder belt portion of the center seat belt and the buckle for the outboard seat belt;

FIG. 31 is a front elevation view of the buckles of FIG. 30 showing the entry opening to the passageway of the shoulder belt portion buckle below the notched press button thereof; and FIG. 32 is an elevation view similar to FIG. 31 except showing an entry opening to the passageway of the outboard seat buckle below the press button thereof.

DETAILED DESCRIPTION OF THE PREFERRED EMBODIMENTS

Figure 1A:
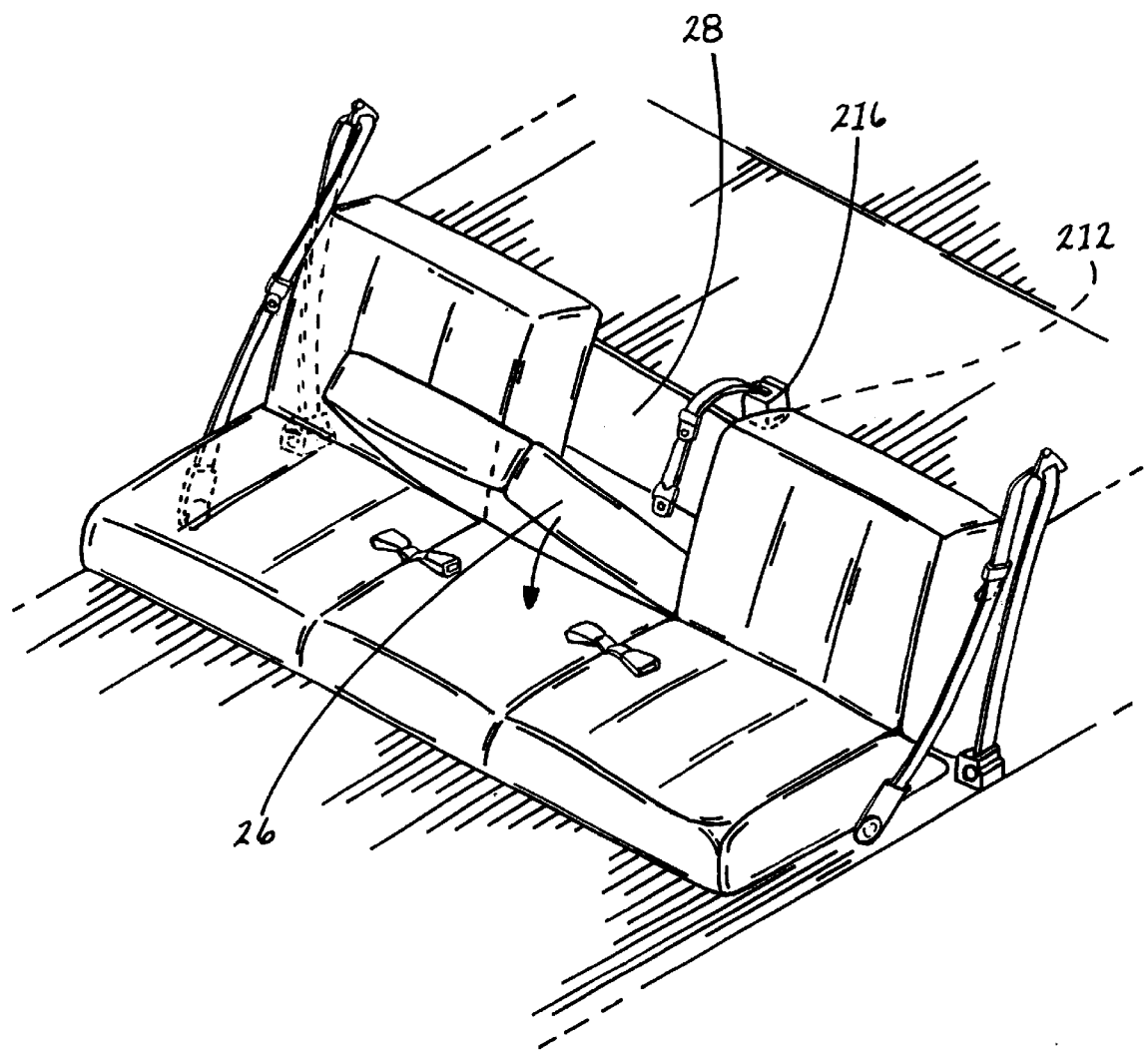
FIG. 1A is a perspective view similar to FIG. 1 showing the tongues of the center seat belt unbuckled to allow the center seat to be folded down without interference from the center seat belt.

In FIG. 1, a seat belt restraint system 10 in accordance with the present invention is illustrated. The seat belt system 10 is shown for use in the rear seating area 12 in a passenger compartment of an automobile such as for the rear bench seat thereof As such, the present invention is particularly well suited for use where a plurality of seats such as the illustrated rear car seats 14, 16 and 18 are in side-by-side relation to each other and where, in particular, the buckles for their seat belts lie in close proximity to each other, as described herein. The seat belt system 10 effectively eliminates the risk of passengers inserting a tongue into an incorrect buckle. Another advantage of the seat belt system 10 herein is that it allows the center seat 18 to employ a three-point type of belt system for restraining the shoulder and chest areas as well as the lap area of an occupant. To this end, the center seat has belting 20 therefor that utilizes two sets of tongues and buckles with one set being for the shoulder belt portion 22 and the other set being for the lap belt portion 24, as shown in FIG. 2. In this manner, the tongues can be unbuckled and the three-point center seat belting 20 will not interfere with folding down of the back rest 26 to allow access from the passenger compartment of the vehicle to the cargo space or trunk 28 behind the rear seats 14–18.

Figure 4:
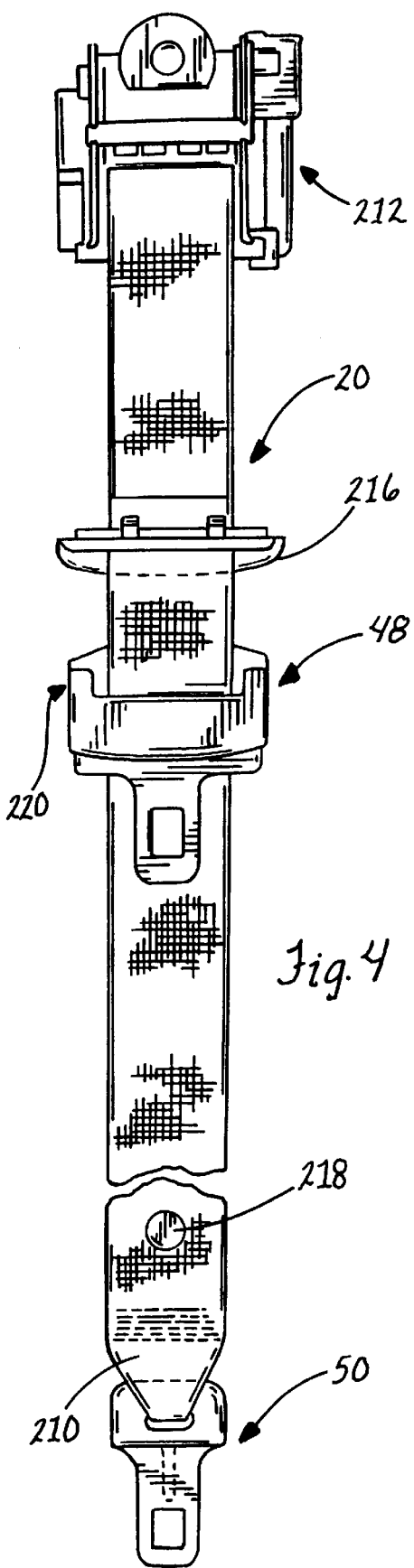
FIG. 4 is a plan view of the center seat belt showing the tongue for the shoulder belt portion at the free end thereof and the tongue for the lap belt portion disposed along the length of the belt.

Accordingly, the seat belt system 10 herein includes three-point seat belt systems for the outboard seats 14 and 16 including belting 30 and 32, respectively having first and second tongues 34 and 36 thereon which can be releasably locked in first and second buckles 38 and 40. As can be seen in FIGS. 1 and 1A, the buckles 38 and 40 when not in use lie on the seating or bench portion 42 and 44 of the outboard seats 14 and 16 closely adjacent the seat portion 46 of the center seat 18. As discussed, the center seat belting 20 has third and fourth tongues 48 and 50, respectively, mounted thereon, as best seen in FIG. 4. The third and fourth tongues 48 and 50 can be releasably locked in respective third and fourth buckles 52 and 54 which lie on the center seat portion 46 adjacent the buckles 38 and 40 lying on the outboard seat portions 42 and 44.

To prevent passengers from taking a tongue and inserting and locking it in the wrong buckle, the seat belt system 10 herein uses tongues that only work with specified buckles therefor. Referring to the chart of FIG. 26, it can be seen that while the outboard seat first and second tongues 34 and 36 will work with either the first and second buckles 38 and 40 which is not of a concern due to the spacing of the outboard seats from each other as previously described, they will not work with either the third buckle 52 or the fourth buckle 54. Similarly, the center seat third tongue 48 will only work with the third buckle 52 and not with either of the outboard buckles 38 and 40 or the fourth buckle 54 for the reasons specified in the chart and as will be described more fully hereinafter. Finally, the fourth tongue 50 will only work with the fourth buckle 54 and not with the third buckle 52 or either of the outboard seat first and second buckles 38 and 40 for the specified reasons.

Figure 3:
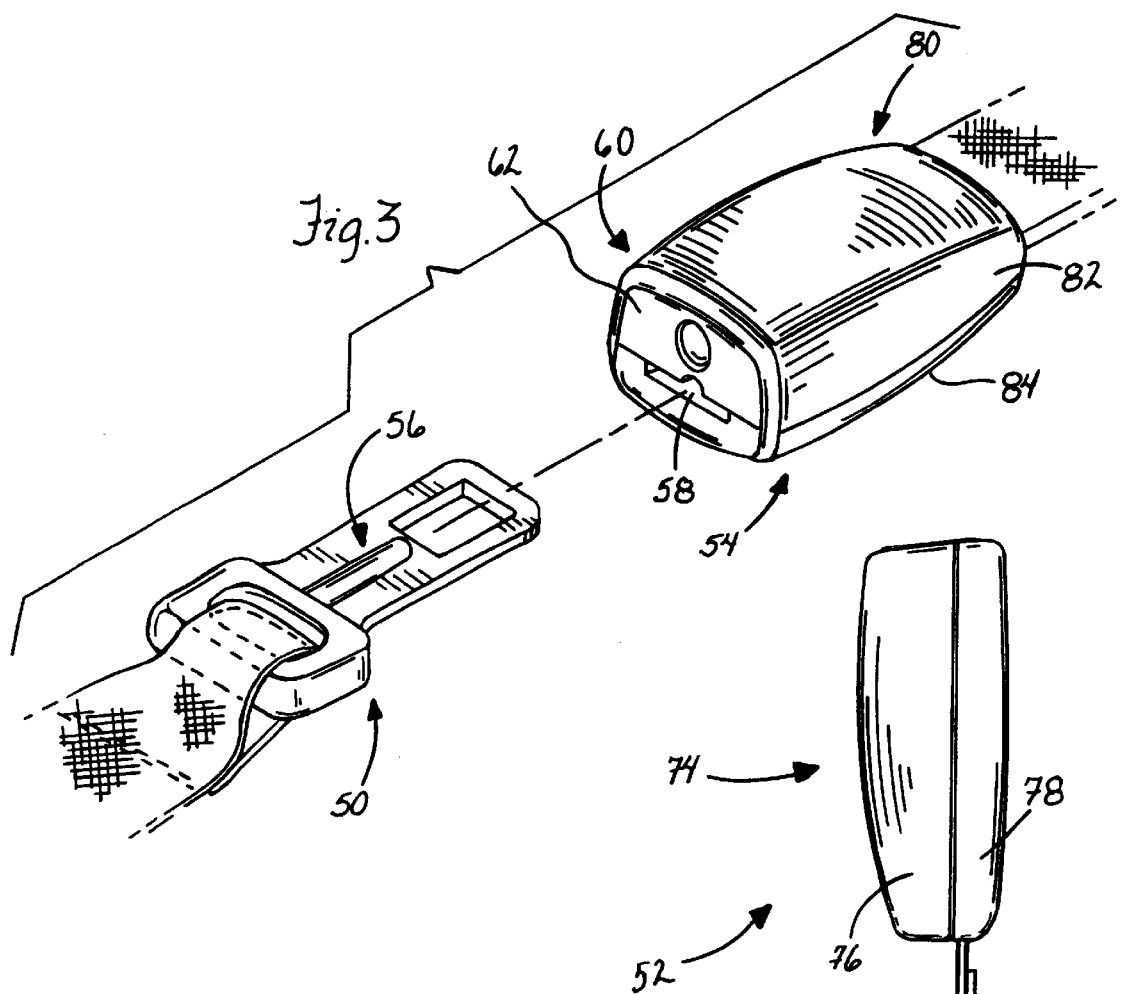
FIG. 3 is a perspective view of the tongue and buckle for the shoulder belt portion of center seat belt showing a key on the tongue and keyway in a press-button of the buckle.

Referring to FIG. 3, it can be seen that the fourth tongue 50 and fourth buckle 54 are modified from the conventional structure of the other tongues and buckles as they are provided with a key and keyway 56 and 58. The key 56 and keyway 58 allow the tongue 50 to be inserted in the buckle 54 by way of their mating fit which also prevents the tongue 50 from being inserted in the first and second buckles 38 and 40 of the outboard seats 14 and 16 and the third buckle 52 of the center seat 18. In this regard, each of the buckles includes an insertion end portion 60 in which their respective tongues are inserted. As shown, the buckle insertion portion 60 includes press button 62 of the fourth buckle 54, press buttons 64 of the outboard buckles 38 and 40 and press button 66 of the center buckle 52.

Figure 13:
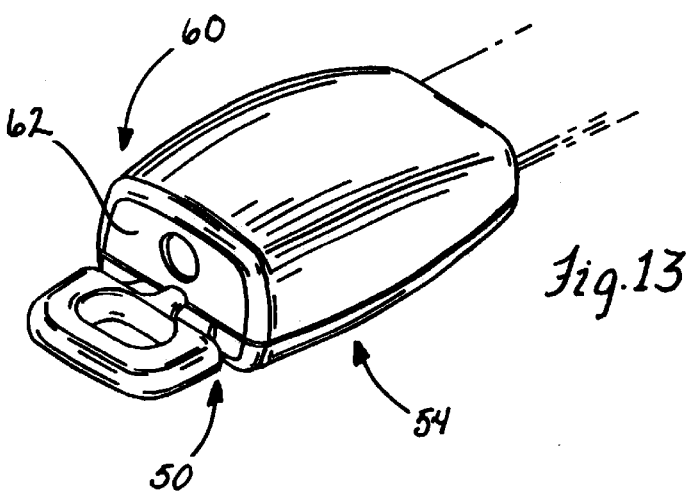
FIG. 13 is a perspective view of the tongue for the shoulder portion of the center seat belt releasably locked in the buckle therefor with the raised rib received in the press button notch.
Figure 14:
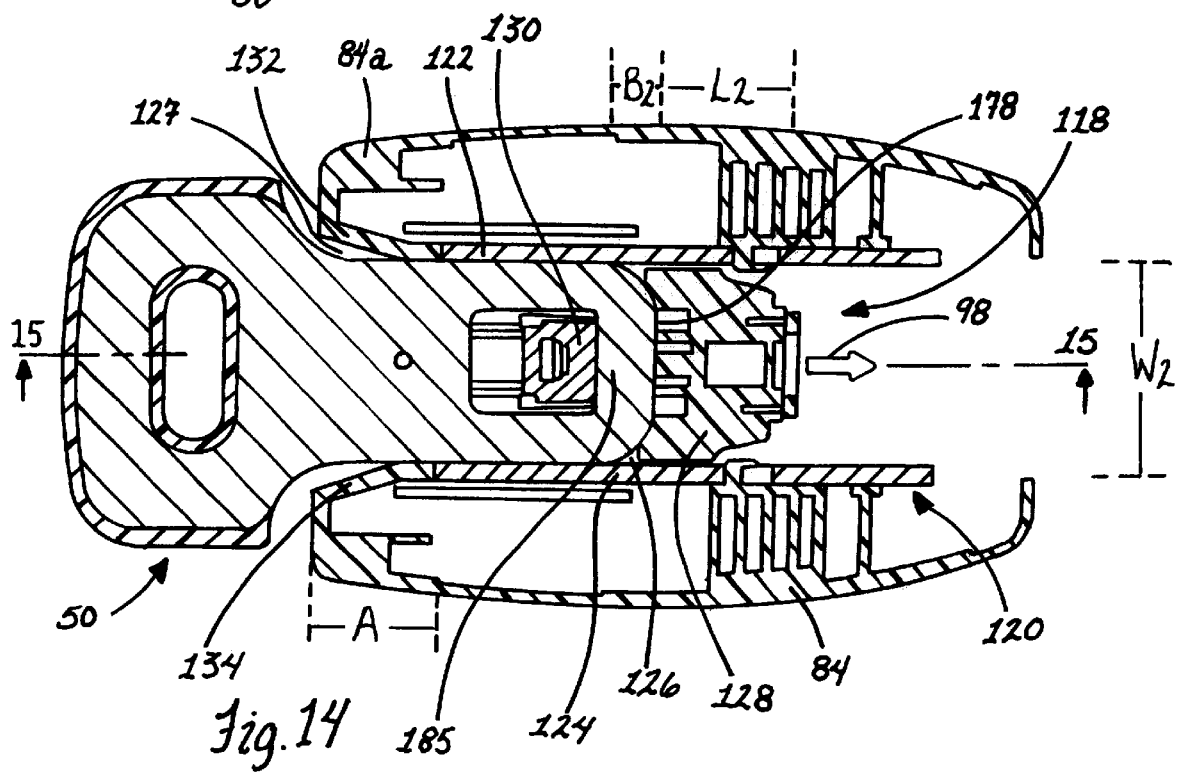
FIG. 14 is a cross-sectional view of the keyed tongue releasably locked in the buckle therefor showing the ejector member of the operating mechanism shifted to cause the lock bar to latch in a window opening of the tongue lead-in portion.
Figure 15:
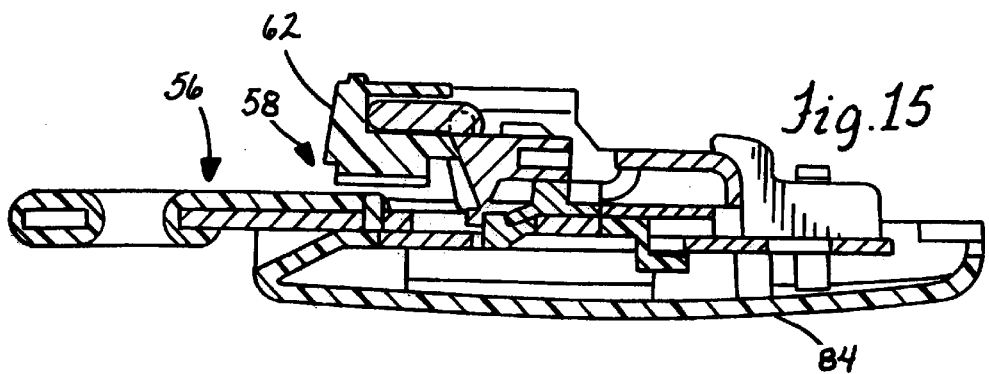
FIG. 15 is a cross-sectional view taken along line 15—15 of FIG. 14.

Referring to FIGS. 13–15, the fourth tongue 50 is shown fully inserted and releasably locked in the fourth buckle 54 with the key 56 thereon mating with the keyway 58 formed in the press button 62. By contrast, FIGS. 21 and 22 show what happens when a passenger attempts to insert the fourth tongue 50 in the outboard seat buckles 38 and 40 or the center seat buckle 52. In these instances, the key 56 on the fourth tongue 50 will abut against the respective press buttons 64 and 66 prior to the tongue 50 being fully inserted into the outboard seat belt buckles 38 and 40 and the center seat buckle 52 due to the lack of a keyway in the press buttons 64 and 66 similar to the one provided in the fourth buckle press button 62. In this manner, the fourth tongue 50 can only be inserted and releasably locked in the fourth buckle 54 therefor.

The first and second tongues 34 and 36 for the outboard seat belts 30 and 32 and the third tongue 38 for the center seat belt 20 cannot be releasably locked in the fourth buckle 54 due to its different predetermined configuration from that of the outboard seat first and second buckles 38 and 40 and center seat third buckle 52. It should be noted, however, that all of the buckles 38, 40, 52 and 54 have substantially similar physical exterior appearances and use substantially the same internal operating components to provide an overall uniformity and thus cost savings for the seat belt system 10 herein. The only readily perceptible difference between the buckles of the seat belt system 10 is the keyway 58 in the fourth buckle press button 62. To this end, each of the outboard seat buckles 38 and 40 which have identical constructions, include a housing 68 having an upper cover 70 and a lower cover 72 thereof Similarly, the center seat third buckle 52 includes a housing 74 having upper and lower covers 76 and 78 thereof The fourth buckle 54 is similarly constructed having a housing 80 with upper and lower covers 82 and 84, respectively.

Generally, each of the buckles has an operating mechanism therefor in the buckle housing. The operating mechanism includes a frame which defines the passageway into which the lead-in portion of the associated tongues can be inserted. The passageways have an entry opening at the insertion end portion of the buckles and an ejector of a latching mechanism at the other end of the passageway interior of the buckle housing. The tongue lead-in portion pushes the ejector for actuating a lock bar of the latching mechanism to shift into a window opening formed in the tongue lead-in portion. To release the tongue, the press button is pushed which lifts the lock bar out from the tongue window opening allowing the ejector to shift the tongue out from the buckle housing. The differences in the construction of the various buckles are directed to their press-buttons and the size of the ejectors and the housing lower covers, as described herein. In all other respects, the buckles are of substantially similar construction.

More particularly, the first and second buckles 38 and 40 each include an operating mechanism 86 which has a frame 88 with two longitudinal extending side members 90 and 92 defining an insertion passageway 94 having a width, W, sized to slidingly receive the first and second tongues 34 and 36 therein, as best seen in FIGS. 17 and 18. An entry or mouth opening 95 to the passageway 94 is defined in the buckle housing 68 below the press button 64 at the insertion end portion 60 thereof, as shown in FIGS. 28 and 32. An ejector member 96 is disposed at a predetermined position in the buckle housing 68 along the insertion passageway 94 thereof The ejector member 96 is provided with a predetermined length, L, for cooperation with the outboard belt tongues 34 and 36, as will be described more fully hereinafter.

Shifting the ejector member 96 from its predetermined position in the insertion direction, as indicated by arrow 98, by a predetermined amount causes a lock bar 100 to latch the tongue 34, 36 in the passageway 94 for being releasably locked in the buckle housing 68. To release the tongue 34, 36, the press button 64 is pushed in the insertion direction 98 against a bias force provided by spring 102 for lifting the lock bar 100 from its latching connection with the tongue 34, 36 and allowing the bias force provided by spring 103 on the ejector member 96 to shift it in a direction opposite to the insertion direction 98 for pushing the tongue 34, 36 out from the buckle housing 68. Each of the buckle operating mechanisms described herein use the above-described springs 102 and 103 which are shown in FIGS. 6 and 7 in the fourth buckle 54.

Figure 23:
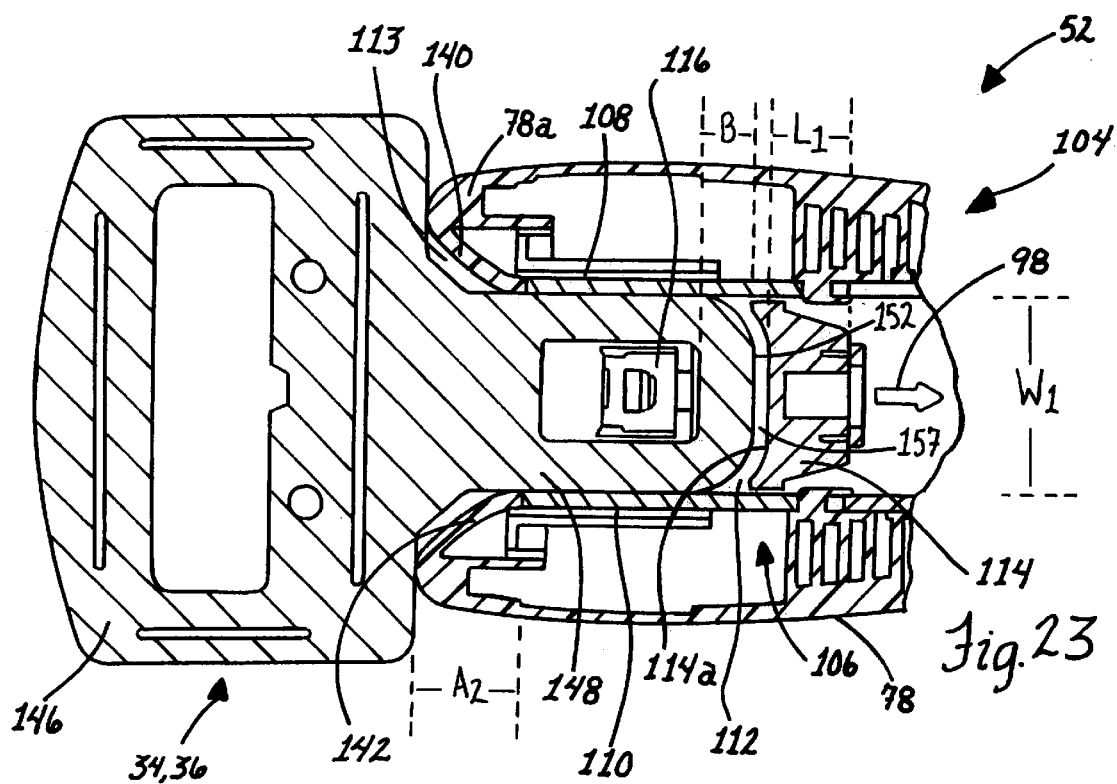
FIG. 23 is a cross-sectional fragmentary view of the tongue for the outboard seat belt having its lead-in portion inserted in the passageway of the buckle for the lap portion of the center seat belt and stopped short of the ejector therein due to engagement with a lower cover of the buckle housing.
Figure 24:
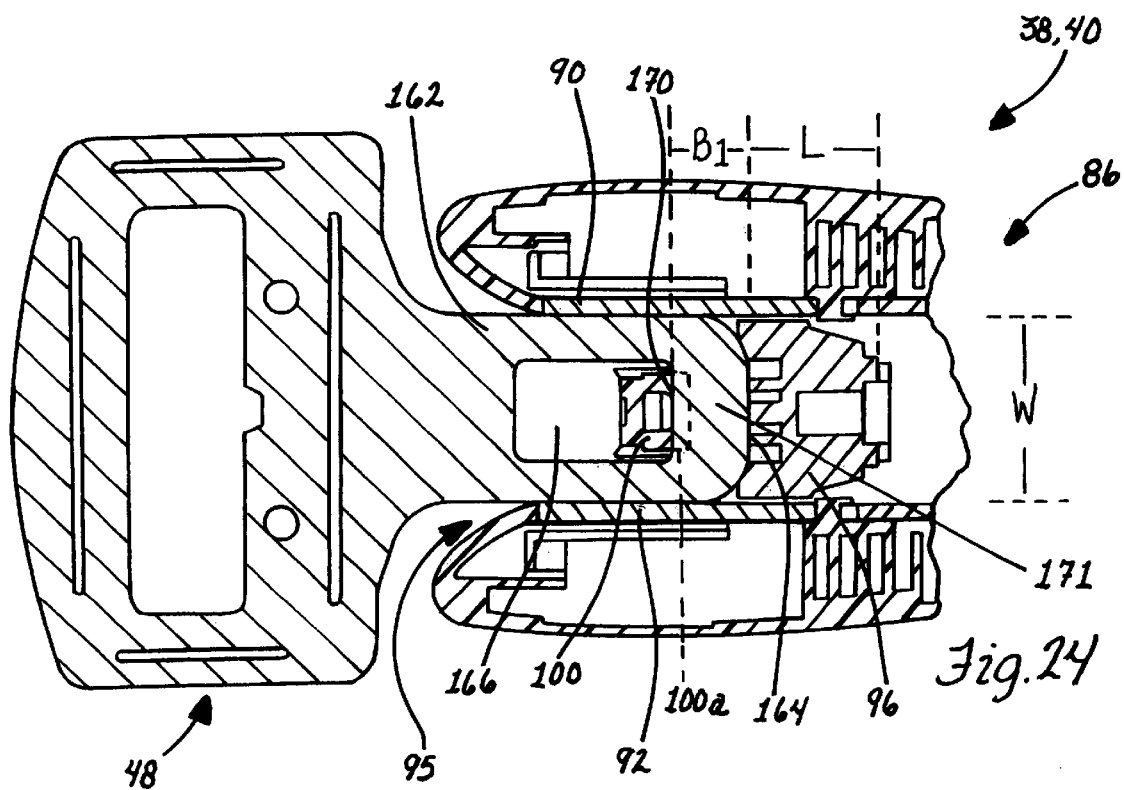
FIG. 24 is a cross-sectional fragmentary view of the tongue for the lap portion of the center belt having its lead-in portion inserted in the passageway of the outboard seat belt buckle pushing the ejector and causing the lock bar to engage the lead-in portion and not latch in the window thereof.
Figure 25:
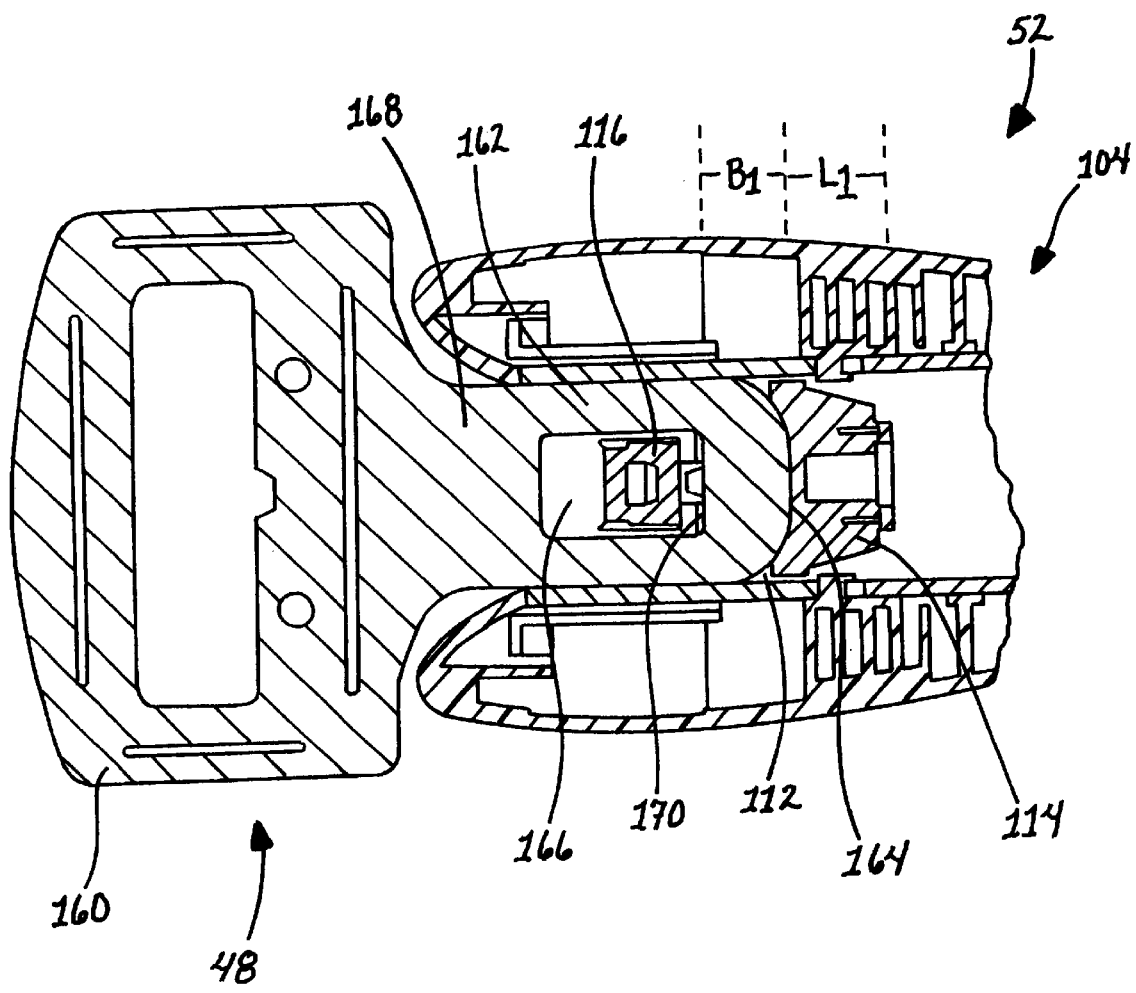
FIG. 25 is a cross-sectional fragmentary view of the tongue for the lap belt portion of the center belt having its lead-in portion inserted to a predetermined depth in the passageway of the buckle therefor and releasably locked by the lock bar therein.

Referencing FIGS. 23 and 25, the operating mechanism 104 of the third buckle 52 is shown which is substantially identical to that of the first and second buckles 38, 40 as can be seen by a comparison with FIG. 24. In this regard, the operating mechanism 104 includes a frame 106 having side members 108 and 110 for defining an insertion passageway 112 for receipt of the third tongue 48 therein. The lateral distance, $W_1$, between the side frame members 108 and 110, is sized to slidingly receive the third tongue 48 therein and is substantially the same as the lateral distance, W, between the side frame members 90 and 92 of the buckle operating mechanism 86. An entry or mouth opening 113 to the passageway 112 is defined in the buckle housing 74 below the press button 66 at the insertion end portion 60 thereof, as shown in FIG. 29.

An ejector member 114 is disposed in the housing 74 at a predetermined position therein along the insertion passageway 112. The length, $L_1$, of the ejector member 114 in the third buckle 52 in the insertion direction 98 is less than the length, L, of the ejector member 96 of the outboard seat belt buckles 38 and 40, for reasons to be described hereinafter. Shifting the ejector member 114 a predetermined distance along the passageway 112 from its predetermined position as by insertion of the third tongue 48 in the buckle 52 causes lock bar 116 to latchingly engage the tongue 48 for releasably locking it therein. To release the tongue 48, the press button 66 is pushed which lifts the lock bar 116 to allow the bias of the ejector member 114 to push the tongue 48 out from the buckle housing 74.

The fourth buckle housing 54 has an operating mechanism 118 therein including a frame 120 with side frame members 122 and 124, as can be seen in FIGS. 14 and 15. The side frame members 122 and 124 define an insertion passageway 126 for receipt of the fourth tongue 50 therein. The lateral distance, $W_2$, across the side frame members 122 and 124 is sized to slidingly receive the tongue 50 and is essentially the same as the corresponding distances W and $W_1$, of the other buckles 38, 40 and 52. An entry or mouth opening 127 to the passageway 112 is defined in the buckle housing 80 below the press button 62 at the insertion end position 60 thereof, as shown in FIG. 31.

An ejector member 128 is located at a predetermined position in the buckle housing 80 along the insertion passageway 112 and can be shifted a predetermined distance therefrom by the fourth tongue 50 for causing a lock bar 130 to latchingly engage the tongue 50 for releasably locking it in the buckle 54. To release the tongue 50, the press button 62 is pushed which lifts the lock bar 130 and allows the bias of the ejector member 128 to push the tongue 50 out from the fourth buckle housing 80. The ejector member 128 is the same as the ejector member 96 of the outboard seat belt buckles 38, 40 and thus its length, L2, is the same as the length, L, of the ejector member 96 and greater than that of the ejector member 114 of the center seat belt third buckle 52.

Accordingly, the first and second buckles 38 and 40 and the fourth buckle 54 use ejectors 96 and 128 having substantially the same configuration differing from the third buckle ejector member 114 in their length. The fourth buckle 54 uses a press button 62 that differs from the press buttons 64 and 66 of the first and second buckles 38 and 40 and the third buckle 52, respectively, in that it has a longitudinally extending notch 131 therein to define keyway 58, as shown in FIG. 7. A further difference in the fourth buckle 54 over the other buckles 38, 40 and 52 is that it is provided with a longer lower cover 84 than the substantially identical lower covers 72 and 78 of the other buckles. More specifically, it is the front portion 84a of the fourth buckle lower cover 84 that differs in its construction from the front portion 72a of the lower cover 72 of the first and second buckles 38 and 40 and thus the front portion 78a of the identical lower cover 78 of the third buckle 52. In this regard, the front cover portion 84a has a length, A, that is slightly longer than the lengths, $A_1$ and $A_2$, of the front cover portions 72a and 78a, respectively, as by approximately 3 mm. Thus, the fourth buckle 54 has a notch keyway 58 in its press button 62 for accepting the keyed fourth tongue 50 therein, and borrows the standard ejector member 96 already used in the first and second buckles 38 and 40 for use as ejector member 128 therein, and makes a very slight change to the length of the front portions 72a and 78a of the standard lower covers 72 and 78 to prevent use of the buckle 54 with the tongues 34, 36, and 48, as described hereinafter. As is apparent, these adaptations to the fourth buckle 54, and in particular with respect to the ejector member and length of the lower cover, are inexpensive from a design and manufacturing standpoint thus lowering costs for the seat belt system 10 herein.

As shown, the lower cover portion 84a has side guide walls 132 and 134 bounding the mouth opening 127 and which have a substantially flat configuration and taper toward each other in the insertion direction 98 to the insertion passageway 120, whereas side guide walls 136 and 138 of the lower cover portion 72a bounding mouth opening 95 and side guide walls 140 and 142 of the cover portion 72a bounding mouth opening 113 have an arcuate shape in tapering toward each other in the insertion direction 98 to respective insertion passageways 94 and 112. The precise shapes of the guide walls can vary as it is the respective lengths of the front cover portion that is important for operation of the seat belt system 10 herein.

Turning next to a description of the tongues, the first and second tongues 34 and 36 are provided with an identical construction each having a substantially flat body 144 of preferably metallic construction and having an enlarged gripping portion 146 and a narrower lead-in portion 148 that extends centrally from the wider gripping portion 146, as shown in FIGS. 17 and 18. In this regard, the lead-in portion 148 has a width thereacross slightly less than the distance, W, between the side frame members 90 and 92 for having a snug sliding fit therebetween. The lead-in portion 148 includes a distal end 150 which is operative to actuate the buckle operating mechanism 86, and specifically the latching mechanism thereof when inserted into the passageway 94 to the predetermined depth therein with the distal end 150 engaging an engagement surface 96a of the ejector member 96, for shifting the ejector 96 from its predetermined position along the passageway 94 by the predetermined amount. The tongue lead-in portion 148 is provided with a window opening 152 disposed at a predetermined location between a proximate portion 154 and the distal end 150 thereof The window opening 152 has a leading edge 156 thereof spaced at a predetermined distance, B, from the distal end 150 so that when the ejector member 96 is shifted by the tongue distal end 150 the predetermined amount, the lock bar 100 of the buckle latching mechanism clears the edge 156 and fits and latches in the window opening 152 for releasably locking the tongue 34, 36 in the buckle 38, 40.

However, when a passenger tries to insert the outboard seat belt tongue 34, 36 into the third buckle 52, because the third buckle uses the shorter ejector member 114, the distal end 152 of the tongue lead-in portion 148 will preferably stop short of the ejector member 114 leaving gap 157 therebetween due to engagement of the tongue gripping portion 146 with the front end portion 78a of the buckle housing 74, as shown in FIG. 23. This gap 157 can be on the order of approximately 5.27 mm. Accordingly, although the tongue lead-in portion 148 slidingly fits in the insertion passageway 112, the first and second tongues 34 and 36 cannot be releasably locked in the third buckle 52.

What prevents the tongues 34, 36 from locking in the buckle 52 is that the tongue lead-in portion 148 and specifically distal end 152 thereof never reaches the predetermined position of the engagement surface 114a of the ejector member 114 in the passageway 112 because the gripping portion 146 bottoms out at the front end portion 78a of the housing 74 before this occurs. In other words, the shorter length, $L_1$, of the ejector member 114 positions its engagement surface 114a sufficiently deep in the buckle passageway 112 so that the lead-in portion 148 cannot shift the ejector member 114 by the predetermined amount necessary to achieve latching with lock bar 116, and as shown in the preferred form cannot reach the ejector member 114 at all. In this manner, the lock bar 116 cannot be shifted into the window opening 152 for latching the tongue 34, 36 in the buckle 52.

Figure 19:
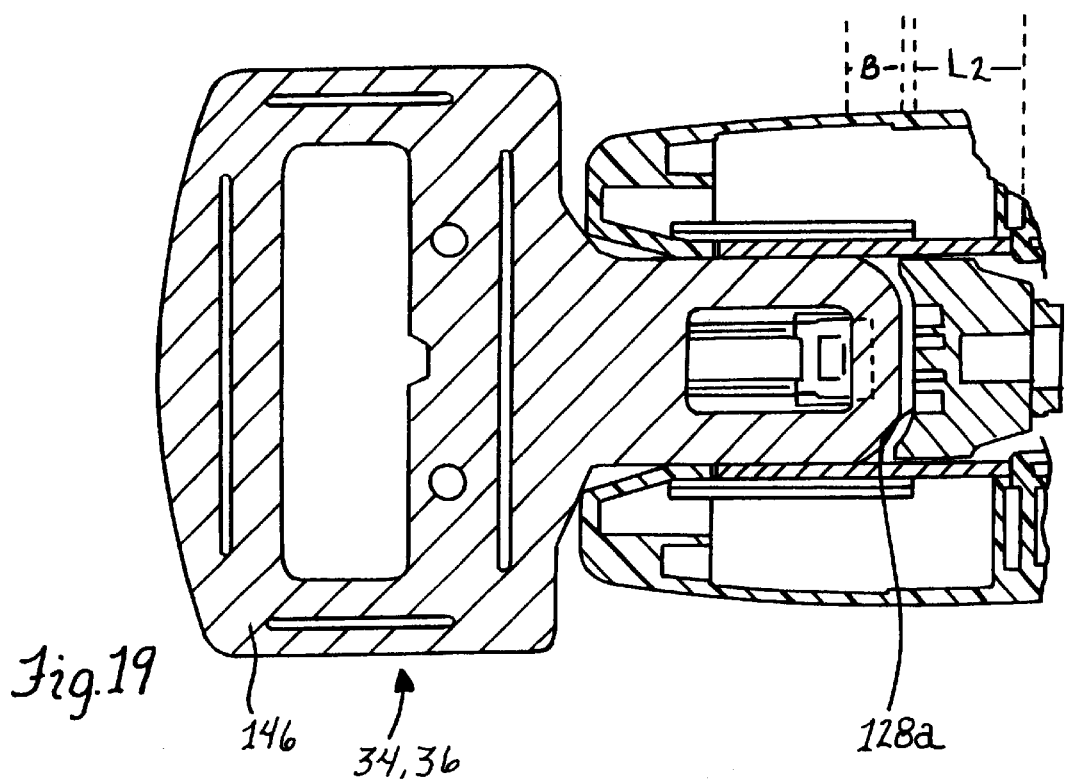
FIG. 19 is a cross-sectional fragmentary view of the lead-in portion of the outboard seat belt tongue inserted in the buckle for the shoulder portion of the center seat belt and stopped short of the ejector therein due to engagement with a lower cover of the buckle housing.
Figure 20:
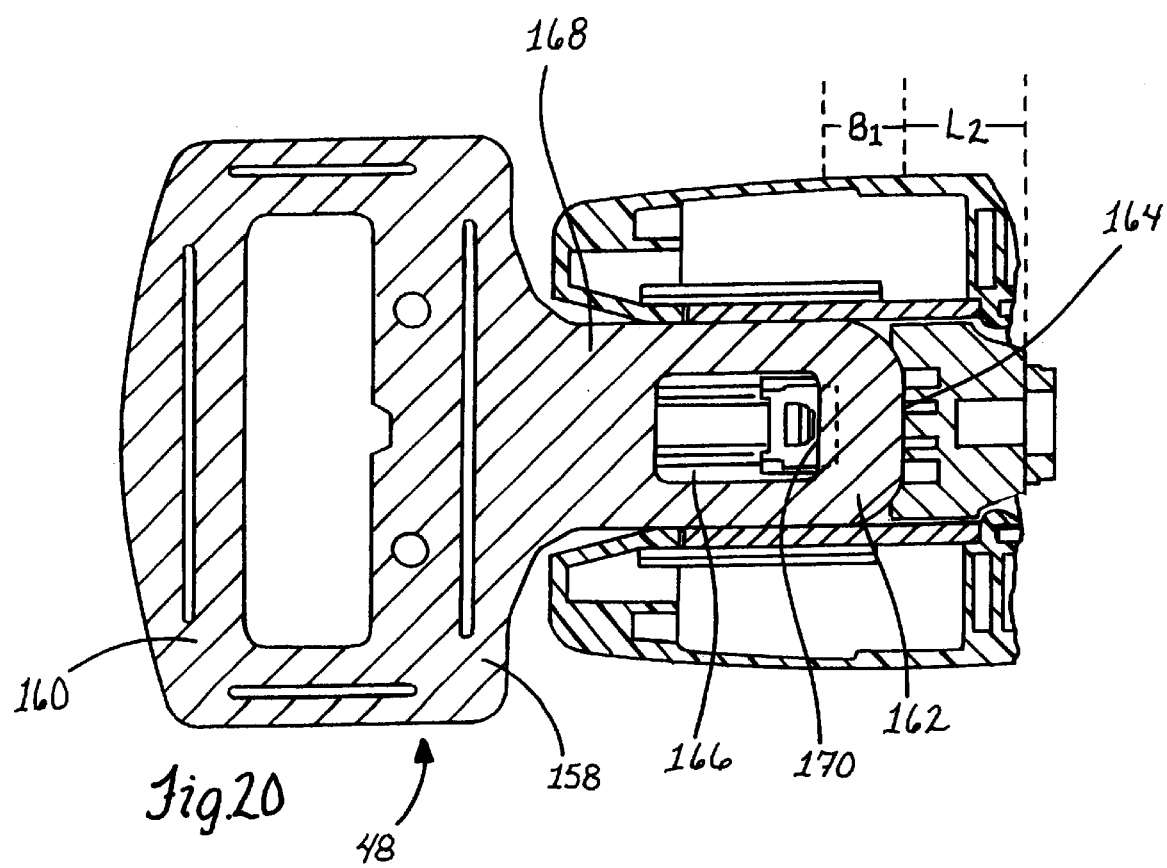
FIG. 20 is a cross-sectional fragmentary view similar to FIG. 19 except with the lead-in portion of the tongue for the lap belt portion of the center belt inserted in the buckle for the center seat shoulder belt portion showing the ejector shifted with the lock bar hitting the tongue lead-in portion and not latching in the window thereof.

The third tongue 48 has substantially the same construction and dimensions as the first and second tongues 34 and 36, as can be seen by a comparison of FIGS. 19 and 20. In this regard, the third tongue 48 has a metallic tongue body 158 including an enlarged gripping portion 160 and a narrow lead-in portion 162 extending centrally therefrom. The lead-in portion 162 included a distal end 164 for shifting the ejector member 114 the predetermined amount in the passageway 112 of the third buckle 52.

The lead-in portion 162 includes a window opening 166 that is disposed at a predetermined location along the lead-in portion between a proximate portion 168 thereof and the lead-in portion distal end 164. This spacing of the window opening 166 from the tongue end 164 is the only difference between the third tongue 48 and the first and second tongues 34 and 36 with this difference not being readily perceptible.

More particularly, the leading edge 170 of the window opening 166 is spaced from the distal end 164 by a predetermined distance, $B_1$, which is greater than the corresponding distance, B, of the first and second tongues 34 and 36, as by approximately 3 mm. In this manner, when the tongue 48 is inserted in the buckle passageway 112 and the distal end 164 engages and shifts the ejector member 114 by the predetermined amount, the lock bar 116 will clear the window leading edge 170 and latch therein for releasably locking the tongue 148 in the buckle housing 74, as shown in FIG. 25. Also, because of the greater length, $B_1$, of section 171 of the tongue lead-in portion 162 between the distal end 164 and window leading edge 170 on the third tongue 48 versus the shorter length, B, of section 159 of the tongue lead-in position 148 between the distal end 152 and the window leading edge 156 of the first and second tongues 34 and 36, when the third tongue 48 is inserted in either one of the first and second buckles 38 and 40, the distal end 164 will shift the ejector member 96 by the predetermined amount which actuates and shifts the lock bar 100. However, instead of latching in the window opening 166, the lock bar 100 will have a portion 100a that engages against the tongue lead-in portion 162, and specifically longer section 171 thereof between the distal end 164 and the window leading edge 170 so as to prevent the tongue 48 from being releasably locked in either of the buckles 38 or 40.

As previously discussed, the fourth tongue 50 will only be releasably locked in the fourth buckle 54 therefor and cannot be releasably locked in the first and second buckles 38 and 40 or the third buckle 52 because of the provision of a key 56 thereon. The fourth tongue 50 has a substantially flat metallic body 172 having a similar construction to the other tongues in that it has an enlarged portion 174 and a narrow lead-in portion 176 extending centrally therefrom, as best seen in FIGS. 8–12. The lead-in portion 176 has a distal end 178 which shifts the ejector member 128 by engagement therewith, and specifically engagement surface 128a thereof in the fourth buckle passageway 126. A window opening 180 is disposed between the distal end 178 and a proximate portion 182 of the tongue lead-in portion 176. The distance, $B_2$, of section 185 of the lead-in portion 176 between the tongue distal end 178 and a leading edge 184 of the window opening 180 is approximately the same as the corresponding distance, B, of the first and second tongues 34 and 36.

Accordingly, since the fourth tongue 50 is the same as the first and second tongues 34 and 36 in their respective distances, B and $B_2$, between the tongue distal end and window leading edge and the ejector member 128 of the fourth buckle 54 is the same size as the ejector member 96 of the first and second buckles 38 and 40 in their respective lengths, $L_2$ and L, in the insertion direction 98, when the lead-in portion 176 shifts the ejector member 128 by the predetermined amount, the lock bar 130 will clear the leading edge 184 of the window opening 180 for latching engagement therein to releasably lock the tongue 50 in the fourth buckle housing 80, as shown in FIGS. 14 and 15, similar to the latching engagement of lock bar 100 of the first and second buckles 38 and 40 in the window 152 of the first and second tongues 34 and 36. As has been discussed, the use of an ejector member 128 in the fourth buckle 54 that is identical to the ejector member 96 used in the first and second buckles 38 and 40 reduces costs associated with the design and manufacture of the fourth buckle 54.

To provide the key 56 on the fourth tongue 50, the preferred and illustrated form is by way of a molded plastic sleeve 186 that can be fit thereon about the enlarged portion 174 of the tongue body 172. In this regard, the sleeve 186 includes a pocket portion 188 thereof for receiving the tongue enlarged portion 174. The pocket portion 188 includes an upper section 190 and a lower section 192 interconnected by integral side webs 194 and 196 of plastic material for defining a pocket 198 into which the enlarged tongue portion 174 is tightly received. Extending from the upper section 190 centrally between the side webs 194 and 196 is an elongate integral rib portion 200. Accordingly, the rib portion 200 is disposed on the proximate portion 182 of the fourth tongue lead-in portion 176 stopping short of trailing edge 202 of its window opening 180. In this manner, the rib portion 200 is raised or projects upward from upper surface 204 of the tongue body 172, and in particular the lead-in portion 176 thereof. As previously mentioned, the raised portion 200 can take other forms besides the elongate rib 200 described herein. The raised rib portion 200 forms the fourth tongue key 56 for mating in the notch keyway opening 131 of the fourth buckle press button 62. To secure the sleeve 186 on the tongue body 172, the rib portion 200 has its forward end 206 adjacent window trailing edge 202 secured to the tongue body 172 as by rivet 208 or the like.

Thus, when a passenger aligns the fourth tongue lead-in portion 176 for fitting in the fourth buckle passageway 126, the centrally disposed key rib 200 will be aligned with the notched keyway 131 in the fourth buckle press button 62. As the passenger slides the fourth tongue 50 into the fourth buckle housing 80, the notched keyway 131 provides clearance for the raised rib portion 200 allowing the lead-in portion distal end 178 to be inserted to the predetermined depth in the housing 80 for shifting the ejector member 128 by the predetermined amount necessary to lock the tongue 50 therein. The key rib 200 is kept aligned with the notched keyway 131 in the press button 62 by the side frame members 122 and 124 on either side of the lead-in portion 176 so that longitudinal shifting of the press button 62 as the insertion process starts and before the key rib 200 enters in the notch keyway 131 will not create misalignments therebetween. Further, unlike the other changes discussed herein, the raised rib portion 200 of the fourth tongue 50 and the notch keyway 131 of the fourth buckle 54 are readily perceptible by passengers as differentiating the fourth tongue 50 and corresponding buckle 54 from the other tongues and buckles of the present seat belt system 10. As the center seat 18 includes two tongues 48 and 50, this visual differentiation aids the passenger of the center seat 18 in choosing the tongue 48 or 50 appropriate for the particular buckle 52 or 54 therefor.

Referring to FIGS. 21 and 22 and as previously discussed, the raised rib portion 200 on the fourth tongue 50 that prevents it from being releasably locked in either of the first and second buckles 38 and 40 or the third buckle 52 due to engagement with respective press buttons 64 and 66 thereof In this regard, because the fourth tongue lead-in portion 176 has a lateral dimension similar to that of the other tongues, it will be able to fit in the insertion passageways 94 and 112 of the buckles 38, 40 and 52, respectively; however, it will not be able to shift the respective ejector members 96 and 114 sufficiently to actuate the lock bars 100 and 116 being stopped by abutment between the leading end of the key rib 200 and the press buttons 64 and 66.

Figure 5:
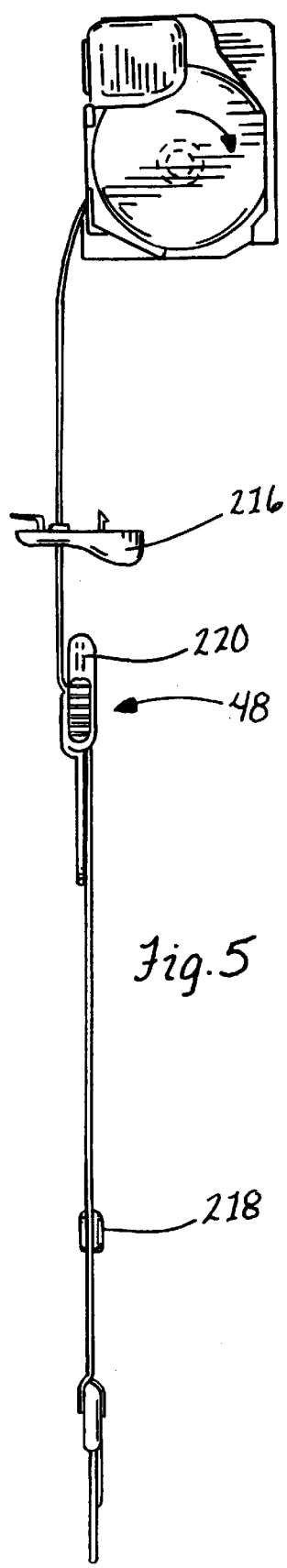
FIG. 5 is an elevation view of the center seat belt of FIG. 4 showing a stop fixed to the belt between the tongues and a retractor for the belt at an end opposite the shoulder belt portion tongue.

As mentioned, the center seat belting 20 has both the third and fourth tongues 48 and 50 thereon. Referring to FIGS. 4 and 5, the fourth tongue 50 is attached to free end 210 of the belting 20 with the belting 20 being wound in retractor 212 at the other end thereof Referring to FIGS. 1 and 2, for aesthetics the retractor 212 is typically mounted below the rear raised shelf 214 in the rear seating area 12 of the vehicle. A cover plate or escutcheon 216 on the belt 20 can be affixed to the shelf 214 for covering the slot opening in the shelf 214 through which the belting 20 passes. The third tongue 48 is mounted to the belt 20 so that it can slide thereon to allow for adjustments in the length of the center lap belt portion 24 to accommodate different sizes of passengers on the center seat 18. A stop member 218 is staked to the belt 20 to limit sliding of the third tongue 38 toward the belt free end 210 and the fourth tongue 50 thereat. Also, the third tongue 48 is provided with molded sleeve 220 for fitting about a majority of the enlarged gripping portion 160 thereof In this regard, the first and second tongues 34 and 36 can have a similar plastic sleeve provided about their respective enlarged gripping portions 146 to provide the tongues 32, 34 and 48 with a similar construction to that of the fourth tongue 50 albeit without the raised key rib portion 200 thereof The use of the tongues 48 and 50 on the center belting 20 allows for a single length of belting to be utilized to form both the shoulder belt portion 22 and lap belt portion 24 to provide the center seat 18 with a three-point type of seat belt restraint system similar to that provided for the outboard seats 14 and 16 on either side thereof To do this, a passenger on the center seat 18 pulls the belt 20 to withdraw webbing from the retractor 212 first drawing the shoulder belt portion 22 across their shoulder and torso and locking the fourth tongue 50 in the fourth buckle 54 adjacent one side of the seat 18. Thereafter, the passenger slides the third tongue 48 along the belting 20 until the right size is obtained for the lap belt portion 24 to allow them to comfortably lock the third tongue 48 in the third buckle 52 adjacent the other side of the seat 18. In addition, when the tongues 48 and 50 are disconnected or released from their respective buckles 52 and 54, the center seat back rest 26 can be folded down to gain access to the cargo space 28 from the passenger compartment without interference from the belting 20 which can be easily moved out of the way in its detached condition, as discussed more fully below.

The outboard seat belts 30 and 32 utilize the standard type of three-point seat belt restraint systems. Accordingly, only the three-point system associated with belt 32 will be described herein. The seat belt 32 is connected at one end to a retractor 220 which is mounted on the floor of the vehicle, as shown in FIGS. 1–3. In some installations, the retractor 220 may be mounted at the vehicle roof rail in the general location where a guide loop 222 is located above and outboard from the seat 16 in the illustrated configuration. The seat belt 32 has a vertical run 32a between the retractor 220 and the guide loop 222 over which the belt 32 freely slides as the occupant grasps the tongue 36 on the belt and pulls it from the retractor 220 to connect the tongue 36 to the buckle 40.

The belt portion 32b extending between the guide loop 222 and a floor anchor 224 is divided into a lap portion 226 and a shoulder portion 228 by the tongue 36. The lap portion 226 is defined between the tongue 36 and the anchor 226 with the tongue 36 locked in the buckle 40. The shoulder portion 228 is defined between the tongue 36 and the guide loop 222. The guide loop 222 is disposed outboard of the seat 16 and above the back rest 230 thereof sufficiently high so that when the passenger pulls the tongue 36 across their body to the buckle 40, the shoulder belt portion 228 will extend at an appropriate angle across the occupant's shoulder and torso, as shown in FIG. 2. In addition, when the tongue 36 is disconnected from the buckle 40, the retractor 220 draws in belting 32 so that it is located outboard of the seat 15, thus allowing the back rest 230 to be pivoted down toward the seat portion 44 without interference from the tensioned belt portions 32a and 32b for gaining access to the trunk 28 from the rear seating area 12 of the vehicle.

For the center seat belt system, the upper mounting point denoted by where the belting 20 begins its descent across the shoulder and chest of the passenger generally needs to be located along or inboard from the side of the center seat 18 so that the proper angle across the passenger with the shoulder belt portion 22 can be obtained, as shown in FIG. 2. Accordingly, if a standard three-point type of restraint system were used with the center seat 18, the location of the upper mounting point would create a situation where the passenger has to pull the belt around the center seat back rest 26 with one hand and hold it there against the retraction force provided by the take-up mechanism in the retractor 216 and use their other hand to pivot the back rest down to avoid interference from the seat belt 20. As is apparent, this creates an undesirable inconvenience in folding down the center seat back rest 26. On the other hand, with the present system having the pair of tongues 48 and 50 on a single length of belt 20, the passenger only has to disconnect both tongues 48 and 50 which leaves the belt 20 freely hanging after being withdrawn into retractor 26 so that they can move it out of the way without having to hold the belt 20 as would be required with the standard system.

Figure 27:
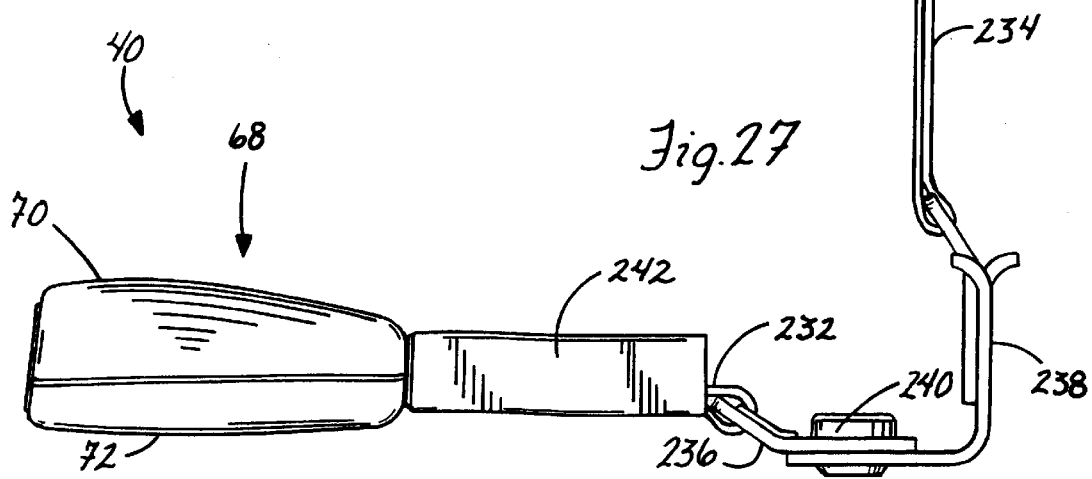
FIG. 27 is a elevation view of the buckle for the lap belt portion of the center seat belt and the buckle for the outboard seat belt.

Some of the details of the illustrated mounting of the buckles of the present restraint system 10 will next be described. FIGS. 27–29 show the second and third buckles 40 and 52 for being anchored between the outboard seat 16 and center seat 18. To this end, the buckle housings 68 and 74 are attached to belt webbings 232 and 234 which, in turn, are attached to anchor plates 236 and 238, respectively. The anchor plates 236 and 238 are connected together by rivet 240 with anchor plate 238 having a right angle construction. Further, a semi-rigid plastic sleeve 242 can extend about the webbing 232 between the end of the anchor plate 236 and the end of the second buckle housing 68.

As shown in FIGS. 30–32, the first buckle 38 and fourth buckle 54 are anchored between the first seat 14 and center seat 18 in a similar fashion to the second buckle 40 and third buckle 52. Accordingly, the first buckle housing 68 is attached to webbing 244 and the fourth buckle housing 80 is attached to webbing 246 which, in turn, are attached to ends of anchor plates 248 and 250, respectively. Anchor plate 250 has a right angle construction and is connected to anchor plate 248 by rivet 252. A plastic sleeve 254 can be provided about the webbing 244 extending between the end of the anchor plate 248 and the end of the first buckle housing 68.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A seat belt system for vehicles, the seat belt system comprising:
    a plurality of seats arranged in side-to-side relation;
    a lower seat rest and a pivotal back rest of one of the seats intermediate seats on either side thereof;
    sets of tongues and buckles for belts of each of the seats having a locked condition for restraining passengers on the seats;
    latching mechanisms of the buckles that are shifted to the locked condition when the corresponding tongues in the sets are inserted to a predetermined depth therein;

a shoulder belt portion of the belt for the intermediate seat; and an additional set of a tongue and a buckle for the shoulder belt portion having a locked condition for restraining a passenger on the intermediate seat with the back rest thereof pivoted up and allowing a passenger to disconnect the tongue and buckle set of the intermediate seat belt and the additional tongue and buckle set for the shoulder belt portion for pivoting the back rest of the intermediate seat down toward the seat rest thereof without interference from the center seat belt including shoulder belt portion thereof.

2. The seat belt system of claim 1 wherein the tongue and buckle sets for the intermediate seat and side seats and the additional tongue and buckle set for the shoulder belt portion include three different sets with one set including two identical pairs of tongues and buckles one for each of the side seats, a second set being for the intermediate seat and a third set being for the shoulder belt portion of the intermediate seat with the tongues of the three different sets only capable of being inserted into locked condition in the corresponding buckle of their set.

3. The seat belt system of claim 1 wherein the plurality of seats are adapted to be arranged as a bench seat in a passenger compartment of an automobile having a cargo space behind the bench seat so that pivoting the back rest of the intermediate seat down provides access to the cargo space from the passenger compartment.

4. The seat belt system of claim 1 wherein the belt for the intermediate seat is a single length of the belt including the shoulder belt portion and having a free end, and the additional set tongue is attached to the belt at the free end thereof and the tongue for the intermediate seat is attached to the belt along the length of the belt spaced from the free end thereof so that with the additional tongue and the tongue for the intermediate seat disconnected from their respective buckles, the back rest of the intermediate seat can be pivoted down without interference from the intermediate seat belt.

5. The seat belt system of claim 1 wherein the buckles of the intermediate seat belt and the shoulder belt portion thereof are each disposed adjacent buckles for the belts of the seats on either side of the intermediate seat, and the tongue and buckle for the shoulder belt portion having a key and keyway which mate with the tongue inserted in the buckle and preventing the shoulder belt portion tongue from being fully inserted in the buckle for the intermediate seat belt and the buckles for the side seat belts.

6. A seat belt restraint system for seats that are adjacent to each other, the restraint system comprising:

a first tongue and buckle for a first belt of a first one of the adjacent seats and having a first predetermined configuration with the first tongue releasably locking in the first buckle to restrain occupants of the first seat;

a second tongue and buckle for a second belt of a second one of the adjacent seats and having a second predetermined configuration with the second tongue releasably locking in the second buckle to restrain an occupant of the second seat;

the first tongue and buckle first predetermined configuration being identical to second tongue and buckle second predetermined configuration with the first and second seats being spaced from each other by a third one of the adjacent seats therebetween;

a third tongue and buckle for a third belt of the third seat and having a third predetermined configuration with the third tongue releasably locking in the third buckle;

the third tongue and buckle third predetermined configuration differing from the identical first and second predetermined configurations of the first and second tongues and buckles so that the third tongue cannot be releasably locked in the first and second buckles and the first and second tongues cannot be releasably locked in the third buckle;

a fourth tongue and buckle for a portion of the third belt and having a fourth predetermined configuration with the fourth tongue releasably locking in the fourth buckle to restrain an occupant of the third seat with the third tongue releasably locked in the third buckle; and the fourth tongue and buckle fourth predetermined configuration differing from the identical first and second predetermined configurations of the first and second tongues and buckles and the third predetermined configuration of the third tongue and buckle so that the fourth tongue cannot be releasably locked in the first, second or third buckles and the first, second and third tongues cannot be releasably locked in the fourth buckle.

7. The seat belt system of claim 6 wherein the tongues have a lead-in portion and the buckles portion have an insertion portion including a passageway opening for the tongue lead-in portion, and a key and keyway are on the tongue lead-in portion and buckle insertion portion, respectively, of the fourth tongue and buckle for the third belt portion with the lead-in portion key of the fourth tongue interfering with the insertion portions of the other buckles to prevent the fourth tongue from being inserted into locked condition therein.

8. The seat belt system of claim 7 wherein the insertion portions include push buttons of each of the buckles with the keyway being in the push button of the fourth buckle for the third belt portion so that with the tongue lead-in portion of the fourth tongue inserted in the passageway opening of the fourth buckle, the key will mate with the push button keyway of the fourth buckle and engage against the push buttons of the other buckles lacking the keyway to prevent full insertion of the fourth tongue therein.

9. The seat belt system of claim 6 wherein the third and fourth buckles are disposed adjacent the first and second buckles, and the buckles each have a latching mechanism that are shifted to a locked condition when the corresponding tongues are inserted to a predetermined depth therein, and the fourth buckle latching mechanism is identical to the latching mechanism of one of (1) the identical buckles, and (2) the third buckle, so that the tongue associated with the other of the identical and third buckles can not be inserted into locked condition therein, and the fourth buckle has a housing portion which prevents the tongue associated with the one buckle from being inserted into locked condition therein.

10. The seat belt system of claim 9 wherein the housing portion has a predetermined length sized to prevent the tongue associated with the one buckle from being inserted to the predetermined depth in the fourth buckle.

11. The seat belt system of claim 9 wherein the tongues each include a window opening and the latching mechanisms each include an actuator and a lock bar for being shifted into the tongue openings by the actuators with the tongues inserted into the corresponding buckles to the predetermined depth, and the actuators of the identical latching mechanisms having a predetermined length and the opening of the tongue associated with the other buckle being disposed at a predetermined position along the tongue which is coordinated with the predetermined length of the actuators so that with the tongue associated with the other buckle inserted to the predetermined depth in the fourth buckle, the lock bar will not register in the tongue opening for locking the tongue in the fourth buckle.

12. A tongue and buckle set for a seat belt, the set comprising:

a buckle housing having an operating mechanism therein;

a tongue body having a lead-in portion;

a passageway in the housing sized for sliding receipt of the lead-in portion;

a distal end of the lead-in portion for actuating the operating mechanism to releasably lock the lead-in portion in the buckle housing when slid in the passageway so that the distal end is at a predetermined depth therein; and a key and keyway of the tongue body and buckle housing having a mating fit to allow the tongue body lead-in portion to slide into the passageway, wherein the buckle housing includes a press button disposed adjacent the passageway for actuating the operating mechanism to allow the locked lead-in portion to be withdrawn from the buckle housing, the tongue lead-in portion has a substantially flat configuration, the key includes a raised portion projecting up from the substantially flat lead-in portion and the keyway includes a notch opening in the press button to provide clearance for the rib as the tongue lead-in portion is inserted into the buckle housing passageway.

13. A tongue and buckle set for a seat belt, the set comprising:

a buckle housing having an operating mechanism therein;

a tongue body having a lead-in portion;

a passageway in the housing sized for sliding receipt of the lead-in portion;

a distal end of the lead-in portion for actuating the operating mechanism to releasably lock the lead-in portion in the buckle housing when slid in the passageway so that the distal end is at a predetermined depth therein; and a key and keyway of the tongue body and buckle housing having a mating fit to allow the tongue body lead-in portion to slide into the passageway, wherein the tongue body is substantially of a metal material and the key is on the tongue body and is of a plastic material, the tongue body has a gripping portion that is wider than the lead-in portion so that it does not fit in the passageway, and a molded plastic sleeve tightly received about the gripping portion and the key is a plastic raised rib integral with the sleeve and extending along the lead-in portion.

14. A tongue and buckle set for a seat belt, the set comprising:

a buckle housing having an operating mechanism therein;

a tongue body having a lead-in portion;

a passageway in the housing sized for sliding receipt of the lead-in portion;

a distal end of the lead-in portion for actuating the operating mechanism to releasably lock the lead-in portion in the buckle housing when slid in the passageway so that the distal end is at a predetermined depth therein; and a key and keyway of the tongue body and buckle housing having a mating fit to allow the tongue body lead-in portion to slide into the passageway, wherein the buckle housing includes a press button that is shiftable in a longitudinal direction for actuating the operating mechanism to allow the locked lead-in portion to be withdrawn from the buckle housing, the keyway includes a notch opening in the press button, the key is on the lead-in portion extending in the longitudinal direction so that with tongue lead-in portion received in the housing passageway the key will be aligned with the press button notch opening irrespective of shifting of the press button.

15. A tongue and buckle set for a seat belt, the set comprising:

a buckle housing having an operating mechanism therein;

a tongue body having a lead-in portion;

a passageway in the housing sized for sliding receipt of the lead-in portion;

a distal end of the lead-in portion for actuating the operating mechanism to releasably lock the lead-in portion in the buckle housing when slid in the passageway so that the distal end is at a predetermined depth therein; and a key and keyway of the tongue body and buckle housing having a mating fit to allow the tongue body lead-in portion to slide into the passageway, wherein the key is a raised portion on the lead-in portion for fitting in the keyway and providing the passenger with a visual indication for differentiating the tongue body from other tongue bodies.

16. The tongue and buckle set of claim 15 wherein the buckle housing includes an entry opening at one end thereof leading to the passageway sized to receive the lead-in portion therethrough and orient the key for fitting into the keyway.

17. The tongue and buckle set of claim 15 wherein the tongue body is substantially of a metal material and the key is on the tongue body and is of a plastic material.

18. The tongue and buckle set of claim 15 wherein the lead-in portion includes a proximate portion having the key thereon and a window opening between the lead-in portion distal end and the proximate portion so that the lead-in portion can be partially inserted into the passageway before the key mates with the keyway and prior to reaching full insertion depth therein.

19. The tongue and buckle set of claim 15 being a first tongue and buckle set and further including second and third tongue and buckle sets each having a buckle housing with a passageway and a tongue body having a lead-in portion for sliding to a predetermined depth in the passageway to be releasably locked therein with the tongue and buckle sets being for use in seats adjacent to each other, one of the second and third sets including an operating mechanism in its buckle housing identical to the first set operating mechanism so that the lead-in portion of the other of the second and third sets cannot be releasably locked therein, a lower housing portion of the first set buckle housing having a predetermined length sized to prevent the lead-in portion of the one set from sliding to the predetermined depth for being releasably locked therein, and the key being on the tongue body of the first set with the key interfering with the buckle housings of the second and third sets to prevent the first set lead-in portion from sliding to the respective predetermined depths therein.

* * * * *